(12) United States Patent
Lin-Hendel

(10) Patent No.: US 8,438,487 B1
(45) Date of Patent: May 7, 2013

(54) METHOD AND SYSTEM FOR ONE-CLICK NAVIGATION AND BROWSING OF ELECTRONIC MEDIA AND THEIR CATEGORY STRUCTURE AS WELL AS TRACKING THE NAVIGATION AND BROWSING THEREOF

(76) Inventor: Catherine Lin-Hendel, Los Gatos, CA (US)

( * ) Notice: Subject to any disclaimer, the term of this patent is extended or adjusted under 35 U.S.C. 154(b) by 882 days.

(21) Appl. No.: 09/577,190

(22) Filed: May 23, 2000

Related U.S. Application Data

(60) Provisional application No. 60/136,149, filed on May 24, 1999.

(51) Int. Cl.
*G06F 3/00* (2006.01)

(52) U.S. Cl.
USPC ............ 715/739; 715/738; 715/841; 715/843

(58) Field of Classification Search .................. 715/854, 715/738, 739, 841, 843
See application file for complete search history.

(56) References Cited

U.S. PATENT DOCUMENTS

| | | | | |
|---|---|---|---|---|
| 5,041,967 A | * | 8/1991 | Ephrath et al. | 715/825 |
| 5,491,795 A | * | 2/1996 | Beaudet et al. | 715/804 |
| 5,546,529 A | * | 8/1996 | Bowers et al. | 715/848 |
| 5,555,354 A | * | 9/1996 | Strasnick et al. | 345/427 |
| 5,740,549 A | * | 4/1998 | Reilly et al. | 705/14 |
| 5,742,768 A | * | 4/1998 | Gennaro et al. | 709/203 |
| 5,760,771 A | * | 6/1998 | Blonder et al. | 715/854 |
| 5,768,578 A | * | 6/1998 | Kirk et al. | 707/100 |
| 5,768,581 A | * | 6/1998 | Cochran | 707/5 |
| 5,786,820 A | * | 7/1998 | Robertson | 715/853 |
| 5,805,167 A | * | 9/1998 | van Cruyningen | 715/808 |
| 5,815,155 A | * | 9/1998 | Wolfston, Jr. | 715/855 |
| 5,835,094 A | * | 11/1998 | Ermel et al. | 715/848 |
| 5,835,905 A | * | 11/1998 | Pirolli et al. | 707/3 |
| 5,842,218 A | * | 11/1998 | Robinson | 707/102 |
| 5,877,766 A | * | 3/1999 | Bates et al. | 715/854 |
| 5,878,421 A | * | 3/1999 | Ferrel et al. | 707/100 |
| 5,878,423 A | * | 3/1999 | Anderson et al. | 707/100 |
| 5,895,470 A | * | 4/1999 | Pirolli et al. | 707/102 |
| 5,918,236 A | * | 6/1999 | Wical | 715/500 |
| 5,924,090 A | * | 7/1999 | Krellenstein | 707/5 |

(Continued)

OTHER PUBLICATIONS

Flanagan David et al. " JavaScript: the definitive Guide, 3rd Edition" Jun. 1998.*

(Continued)

*Primary Examiner* — Ba Huynh
(74) *Attorney, Agent, or Firm* — P. G. Scott Born; Foster Pepper PLLC

(57) ABSTRACT

Method and apparatus facilitate browsing of web pages or other electronic content stored over a network of remote and/or local storage devices. Browsing is performed without repeated intermediary clicking and page downloads. Pre-browsing of the category structure is provided via rolling the cursor from category to category, and level to level, to view each category's sub-categories, without clicking on a category or downloading web-page(s) linked to the category. When the user selects the content linked to a particular category, the user invokes the link-token corresponding to the content to retrieve the content. A dynamic tracking-string with an embedded one-click nested/cascading category browsing apparatus facilitates returning and/or changing path during browsing and examination of electronic media, and allows the user to review more than one path along the category structure while the browser is at a page linked to any category at any level.

26 Claims, 27 Drawing Sheets

U.S. PATENT DOCUMENTS

| | | | | |
|---|---|---|---|---|
| 5,930,788 | A * | 7/1999 | Wical | 707/5 |
| 5,940,075 | A * | 8/1999 | Mutschler et al. | 715/760 |
| 5,940,821 | A * | 8/1999 | Wical | 707/3 |
| 6,023,701 | A * | 2/2000 | Malik et al. | 707/10 |
| 6,031,537 | A * | 2/2000 | Hugh | 715/854 |
| 6,038,560 | A * | 3/2000 | Wical | 707/5 |
| 6,091,415 | A * | 7/2000 | Chang et al. | 715/809 |
| 6,104,400 | A * | 8/2000 | Halachmi et al. | 715/854 |
| 6,112,201 | A * | 8/2000 | Wical | 707/5 |
| 6,121,970 | A * | 9/2000 | Guedalia | 715/760 |
| 6,128,009 | A * | 10/2000 | Ohkura et al. | 725/46 |
| 6,154,213 | A * | 11/2000 | Rennison et al. | 715/854 |
| 6,226,655 | B1 * | 5/2001 | Borman et al. | 715/501.1 |
| 6,236,400 | B1 * | 5/2001 | Guerrero | 715/841 |
| 6,243,699 | B1 * | 6/2001 | Fish | 707/2 |
| 6,252,597 | B1 * | 6/2001 | Lokuge | 715/841 |
| 6,253,188 | B1 * | 6/2001 | Witek et al. | 705/14 |
| 6,256,028 | B1 * | 7/2001 | Sanford et al. | 715/841 |
| 6,271,840 | B1 * | 8/2001 | Finseth et al. | 715/513 |
| 6,278,991 | B1 * | 8/2001 | Ebert | 707/3 |
| 6,285,366 | B1 * | 9/2001 | Ng et al. | 715/853 |
| 6,286,002 | B1 * | 9/2001 | Axaopoulos et al. | 707/10 |
| 6,301,576 | B1 * | 10/2001 | Wolfe | 707/5 |
| 6,311,194 | B1 * | 10/2001 | Sheth et al. | 715/505 |
| 6,345,273 | B1 * | 2/2002 | Cochran | 707/4 |
| 6,369,840 | B1 * | 4/2002 | Barnett et al. | 715/853 |
| 6,385,602 | B1 * | 5/2002 | Tso et al. | 707/3 |
| 6,404,446 | B1 * | 6/2002 | Bates et al. | 715/854 |
| 6,434,556 | B1 * | 8/2002 | Levin et al. | 707/5 |
| 6,452,609 | B1 * | 9/2002 | Katinsky et al. | 715/716 |
| 6,496,842 | B1 * | 12/2002 | Lyness | 715/206 |
| 6,549,220 | B1 * | 4/2003 | Hsu et al. | 715/854 |
| 6,567,800 | B1 * | 5/2003 | Barrera et al. | 707/3 |
| 6,583,794 | B1 * | 6/2003 | Wattenberg | 715/708 |
| 6,594,670 | B1 * | 7/2003 | Genser | 707/102 |
| 6,606,101 | B1 * | 8/2003 | Malamud et al. | 715/715 |
| 6,625,609 | B1 * | 9/2003 | McDade et al. | 707/102 |
| 6,636,244 | B1 * | 10/2003 | Kelley et al. | 715/781 |
| 6,664,980 | B2 * | 12/2003 | Bryan et al. | 715/738 |
| 6,665,838 | B1 * | 12/2003 | Brown et al. | 715/501.1 |
| 6,677,964 | B1 * | 1/2004 | Nason et al. | 715/764 |
| 6,728,705 | B2 * | 4/2004 | Licon et al. | 707/3 |
| 6,754,660 | B1 * | 6/2004 | MacPhail | 707/100 |
| 6,760,720 | B1 * | 7/2004 | De Bellis | 707/3 |
| 6,772,139 | B1 * | 8/2004 | Smith, III | 707/3 |
| 6,799,174 | B2 * | 9/2004 | Chipman et al. | 707/3 |
| 6,801,916 | B2 * | 10/2004 | Roberge et al. | 707/101 |
| 6,816,175 | B1 * | 11/2004 | Opalka et al. | 715/854 |
| 6,853,391 | B2 * | 2/2005 | Bates et al. | 715/854 |
| 6,920,445 | B2 * | 7/2005 | Bae | 707/2 |
| 6,931,408 | B2 * | 8/2005 | Adams et al. | 707/100 |
| 6,931,604 | B2 * | 8/2005 | Lane | 715/853 |
| 6,938,218 | B1 * | 8/2005 | Rosen | 715/850 |
| 6,961,731 | B2 * | 11/2005 | Holbrook | 707/102 |
| 7,032,183 | B2 * | 4/2006 | Durham | 715/823 |
| 7,039,684 | B2 * | 5/2006 | Blockton et al. | 709/213 |
| 7,039,860 | B1 * | 5/2006 | Gautestad | 715/205 |
| 7,062,453 | B1 * | 6/2006 | Clarke | 705/26 |
| 7,181,692 | B2 * | 2/2007 | Siegel | 715/727 |
| 7,210,094 | B2 * | 4/2007 | Dovin et al. | 715/240 |
| 2001/0037347 | A1 * | 11/2001 | Kelliher et al. | 707/530 |
| 2002/0129114 | A1 * | 9/2002 | Sundaresan et al. | 709/213 |
| 2003/0014415 | A1 * | 1/2003 | Weiss et al. | 707/10 |
| 2003/0146939 | A1 * | 8/2003 | Petropoulos et al. | 345/810 |
| 2006/0106793 | A1 * | 5/2006 | Liang | 707/5 |

OTHER PUBLICATIONS

Zellweger et al. "Fluid links for informed and incremental link transitions" 1998.*

Kopetsky et al. "Visual preview for link traversal on the world wide web" 1999.*

Flanagan, David, et al. "JavaScript: the definitive guide" 1996, 1997, 1998.*

Smith et al. "Java for the World Wide Web: Visual QuickStart Guide" "chapter 14 Hierarchical menu", 1998.*

* cited by examiner

Figure 1-A - Prior Art

Figure 1-B-1 - Prior Art

Animals (2368)
  General (1341)
  Bird (1002)
  Cat (928)
  Dog (2782)
  Fantasy (294)
  Farm (379)
  Horse (459)
  Reptile (136)
  Zoo (436)

Animation Art (11068)
  General (288)
  Hand-Painted (173)
  Production Art (4832)
  Sericels (172)

Animation Characters (75330)
  General (4528)
  Hanna-Barbera (505)
  Japanese Animation (2538)
  King Features (708)
  Walter Lantz (37)
  Warner Brothers (1614)

Art (18653)
  General (2538)
  Amateur Art (334)
  Artist Offerings (4523)
  Calendars (641)
  Decorator/Designer (893)
  Painting (1323)
  Posters (1117)
  Prints (8931)
  Supplies (330)

* Art: Nudes moved

Art:Fine (3263)
  Paintings (2869)
  Drawings (247)
  Sculptures (1195)
  Multiple Techniques (790)

Autographs (11408)
  General (1254)
  Entertainment (9603)
  Political (177)
  Sci-Fi (474)

Banks (1798)
  General (1423)
  Mechanical (245)
  Still (823)

Magnets (97)

Maps / Atlas (1801)
  General (1270)
  Road Maps (531)

Memorabilia (46915)
  Historical (2677)
  Music (1119)
  Royal (804)
  Movie (17132)
  Rock-n-Roll (12964)
  Television (18987)
  Theatre (2631)
  Western (1239)
  Other (1349)

Metalware (7023)
  General (2602)
  Aluminum (572)
  Bronze (1228)
  Copper (440)
  Pewter (906)
  Silver (1453)
  Silver Plate (737)

Militaria (22277)
  General (6204)
  Ancient (106)
  Civil War (1274)
  Pre WW I (537)
  WW I (1654)
  WW II (3187)
  Korea (248)
  Vietnam (1047)
  Surplus (999)

Music Boxes (967)

Native Americana (6406)
  General (1062)
  Arts, Crafts (2680)
  Artifacts (1438)
  Pre-1940 (716)

Orientalia (2613)

Paper (31208)
  General (1663)
  Ephemera (2899)
  Matchbooks (792)
  Menus (146)
  Newspapers (2940)
  Playing Cards (750)

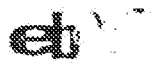
Figure 1-D  - Prior Art

Figure 2-A - Prior Art

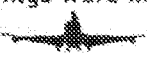
Figure 2-B - Prior Art

Figure 3-A - Prior Art

Accent Pieces
Accessories
Appliances
Architectural Hardware
Area Rugs
Armoires
Art Tile
Bar Faucets
Bar Sinks
Bar Stools
Barbecue Grills
Baskets
Bath Accessories
Bath Lighting
Bath Mirrors
Bath Sink Faucets
Bath Sinks
Bathroom Fixtures and Fittings
Bay and Bow Windows
Beds
Benches and Settees
Benches & Stools
Bidet Faucets
Bookcases
Bottles and Canisters
Butcher Block Countertops
Cabinet Knobs and Pulls
Cabinetry
Casement Windows
Ceiling Fixtures
Ceramic Tile Countertops
Chandeliers
China Cabinets
Coffee Tables
Composite Flooring
Computer Workstations
Concrete Countertops
Console Tables
Cooktops
Countertop Tile
Countertops
Curtain Rods
Decorative Mirrors
Desk Chairs
Desks
Dining Chairs
Dining Tables
Dishwashers
Door Hinges
Door Knobs
Double-hung Windows Dressers & Chests
End Tables
Entertainment Centers
Entrance Doors
Exterior Lighting
Fireplace Accessories
Fireplace Inserts
Fireplaces and Wood Stoves
Fixed Windows
Floor Lamps
Floor Tile
Flooring
Freestanding Fireplaces
French Doors
Furniture and Home Furnishings
Grab Bars & Handles
Hair Dryers
Hampers
Hand Dryers
Hooks
Hot Tubs and Spas
Kitchen Cabinets
Kitchen Faucets
Kitchen Sinks
Kitchen Sinks and Faucets
Kitchen Work Tables
Latchsets
Lighting
Locksets
Mantels
Medicine Cabinets
Metal Countertops
Night Tables
Occasional Chairs
Other Tables
Outdoor Furniture
Patio Doors
Pendants
Range Hoods
Ranges
Refrigerators
Saunas
Saunas and Steam Baths
Seats and Stools
Secretaries
Shelves
Shower Doors and Enclosures
Shower Modules and Bases
Sideboards Skylights
Slider Windows
Sliding Doors
Small Appliances
Soap Dishes and Dispensers
Sofas
Solid Surface Countertops
Steam Baths and Showers
Stone Countertops
Stone Tile Countertops
Storage Pieces
Table Lamps
Task Lighting
Tile and Stone
Toilet Brushes
Toilet Seats
Toilet Tissue Holders
Toilets & Bidets
Toothbrush Holders
Towel Bars
Towel Racks
Towel Rings
Towel Warmers
Track Lighting
Tub and Shower Valves and Equipment
Tub Fillers
Tubs
Tumblers and Tumbler Holders
Turn-tilt Windows
Upholstered Chairs and Ottomans
Vanities & Consoles
Ventilation
Wall Ovens
Wall Sconces
Wall Tile
Wall Units
Warming Drawers
Washers and Dryers
Waste Baskets
Whirlpools and Air Tubes
Windows and Exterior Doors
Wine Cabinetry
Wine Chillers
Wine Storage
Wood Flooring
Wood Stoves
Woodburning Ovens Figure 3-B - Prior Art

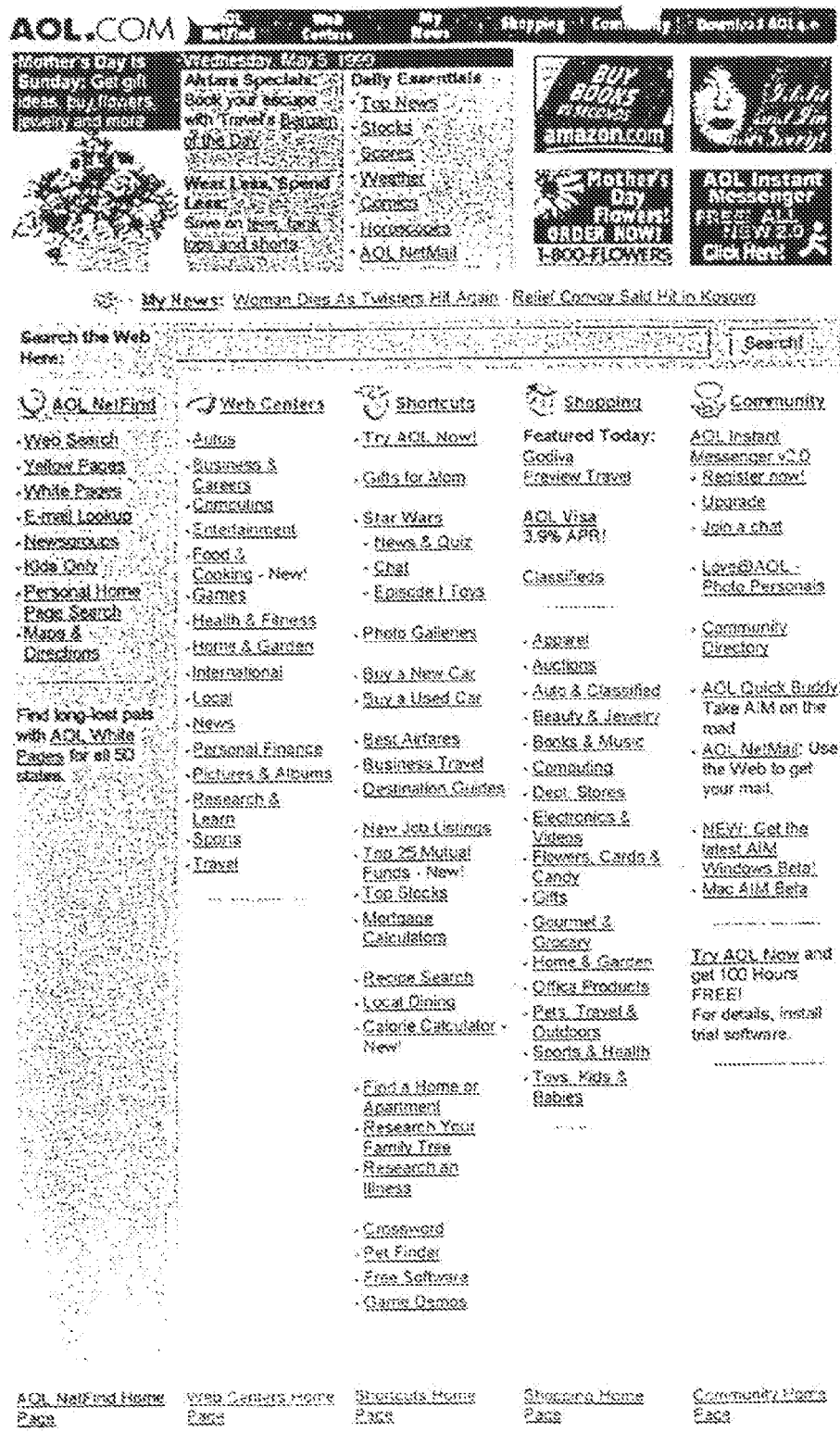
Figure 4-A - Prior Art

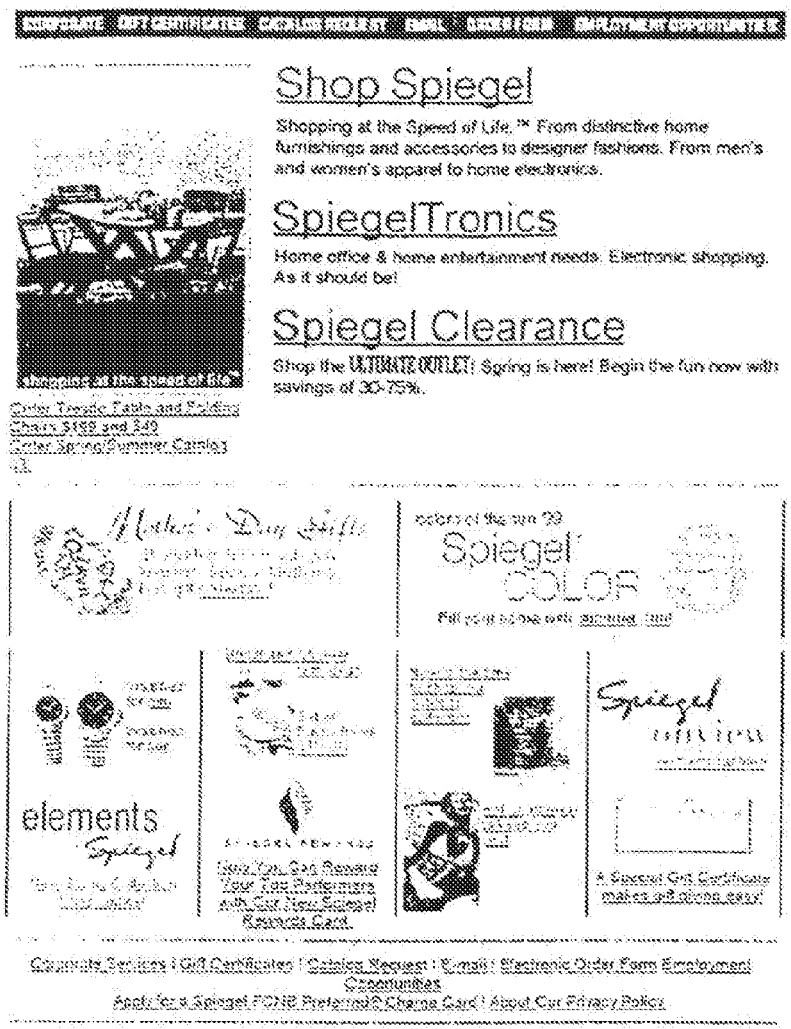
Figure 5-A - Prior Art

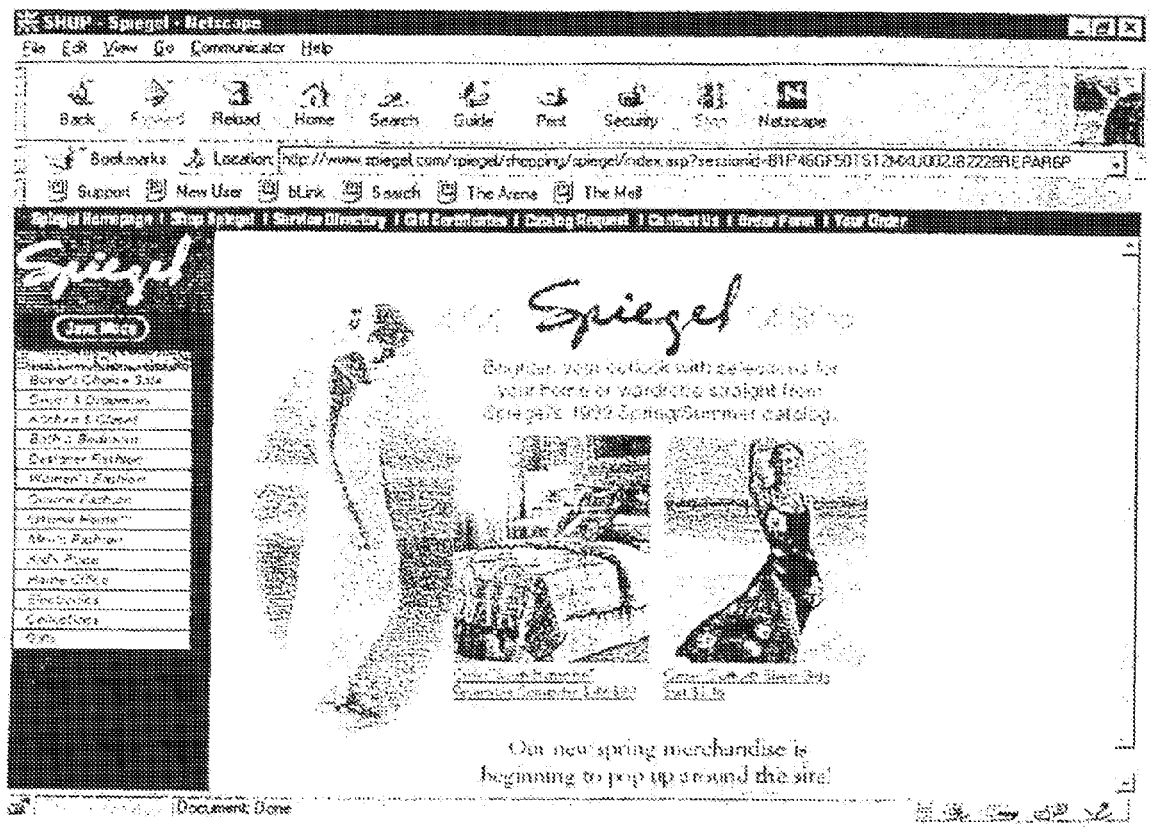
Figure 5-B - Prior Art

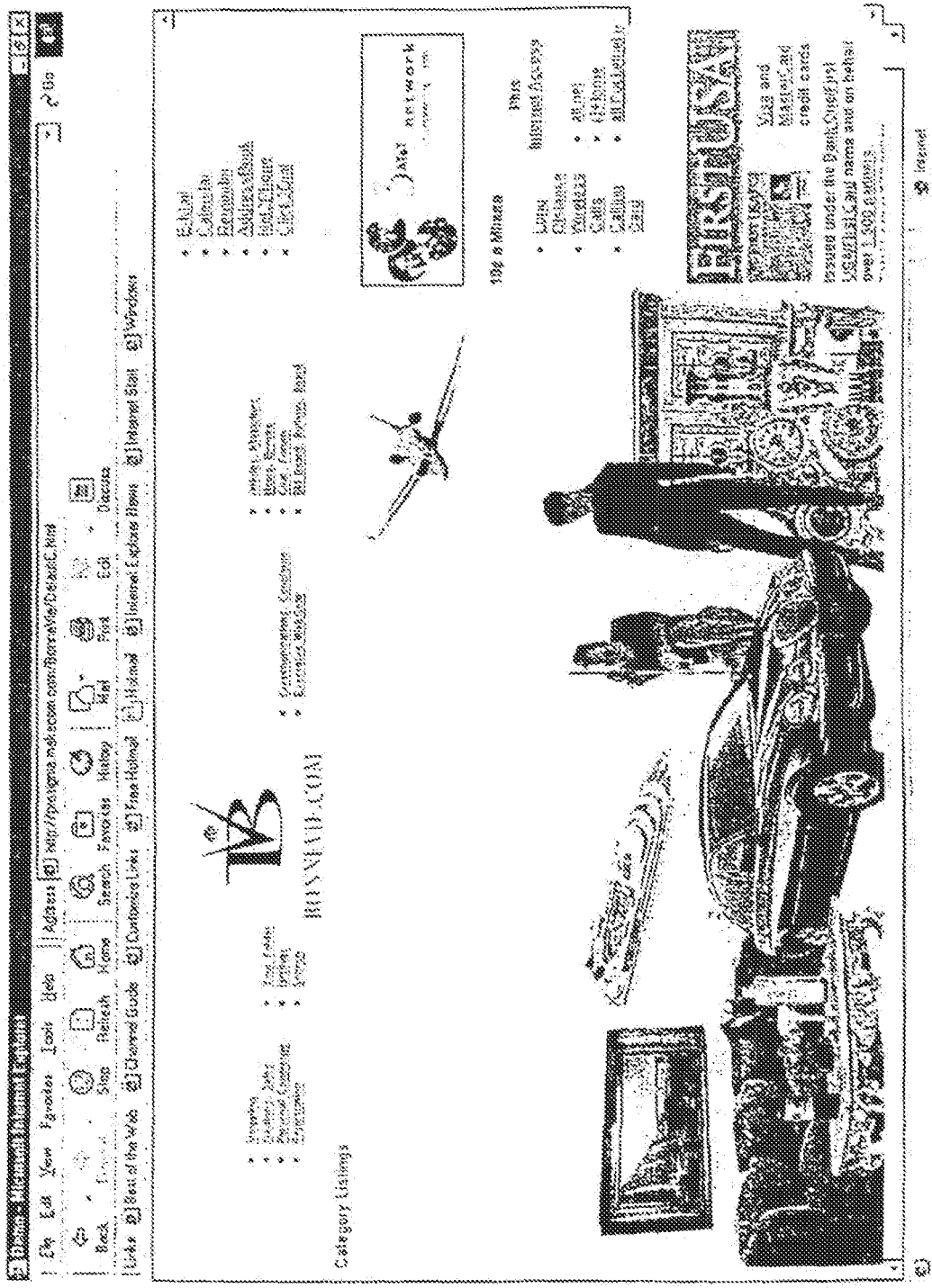
Figure 6-A

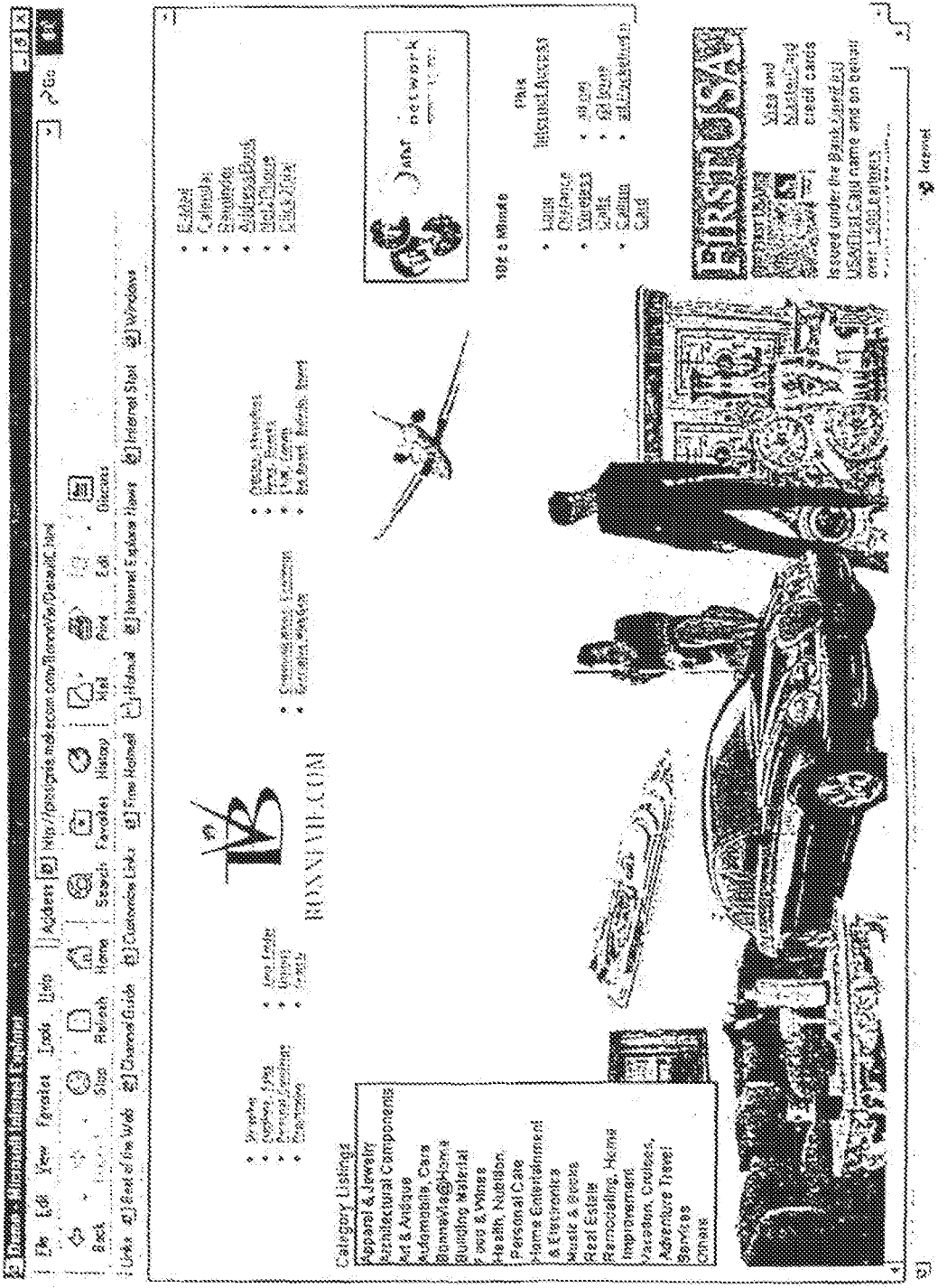
Figure 6-B

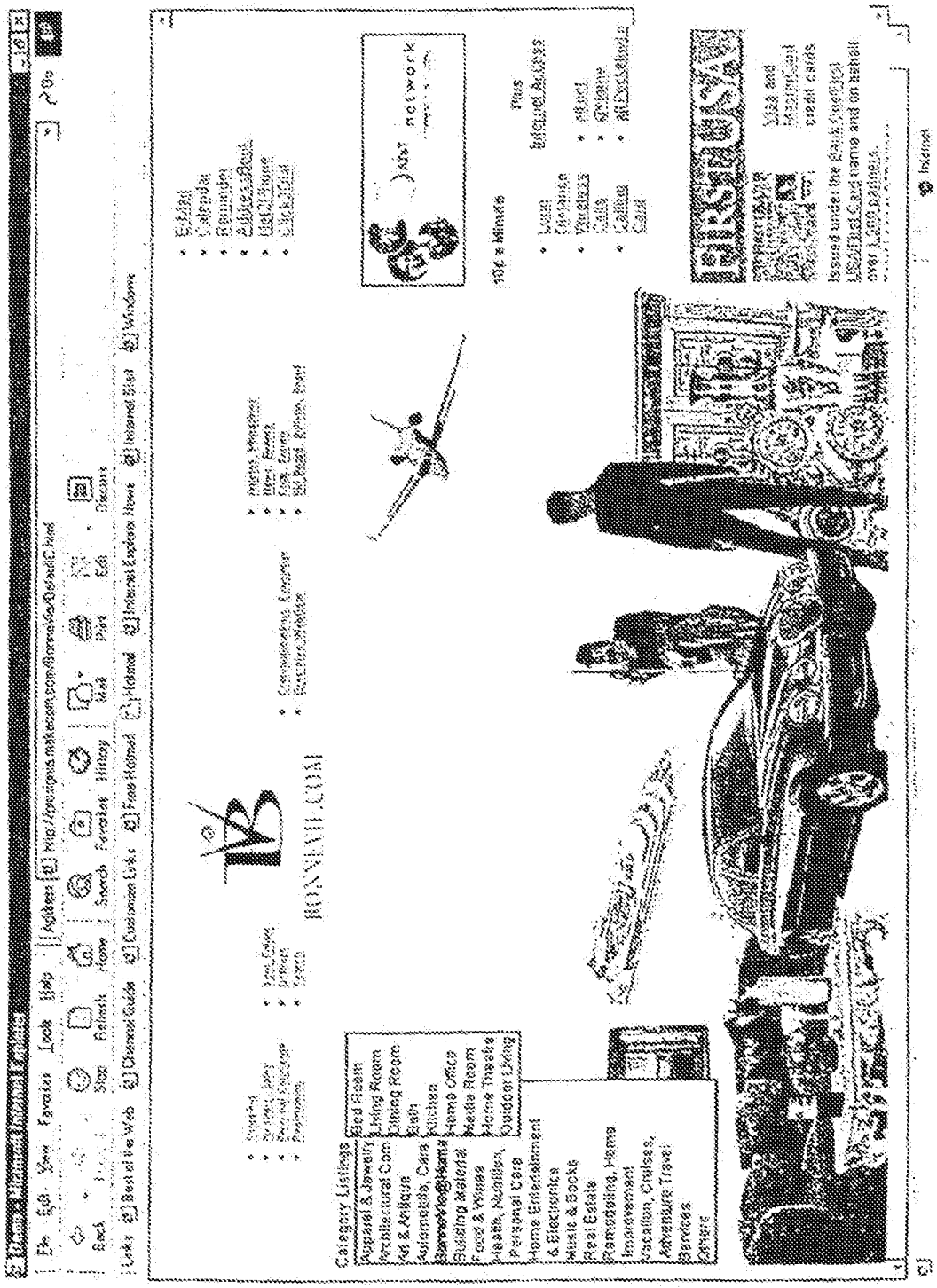
Figure 6-C

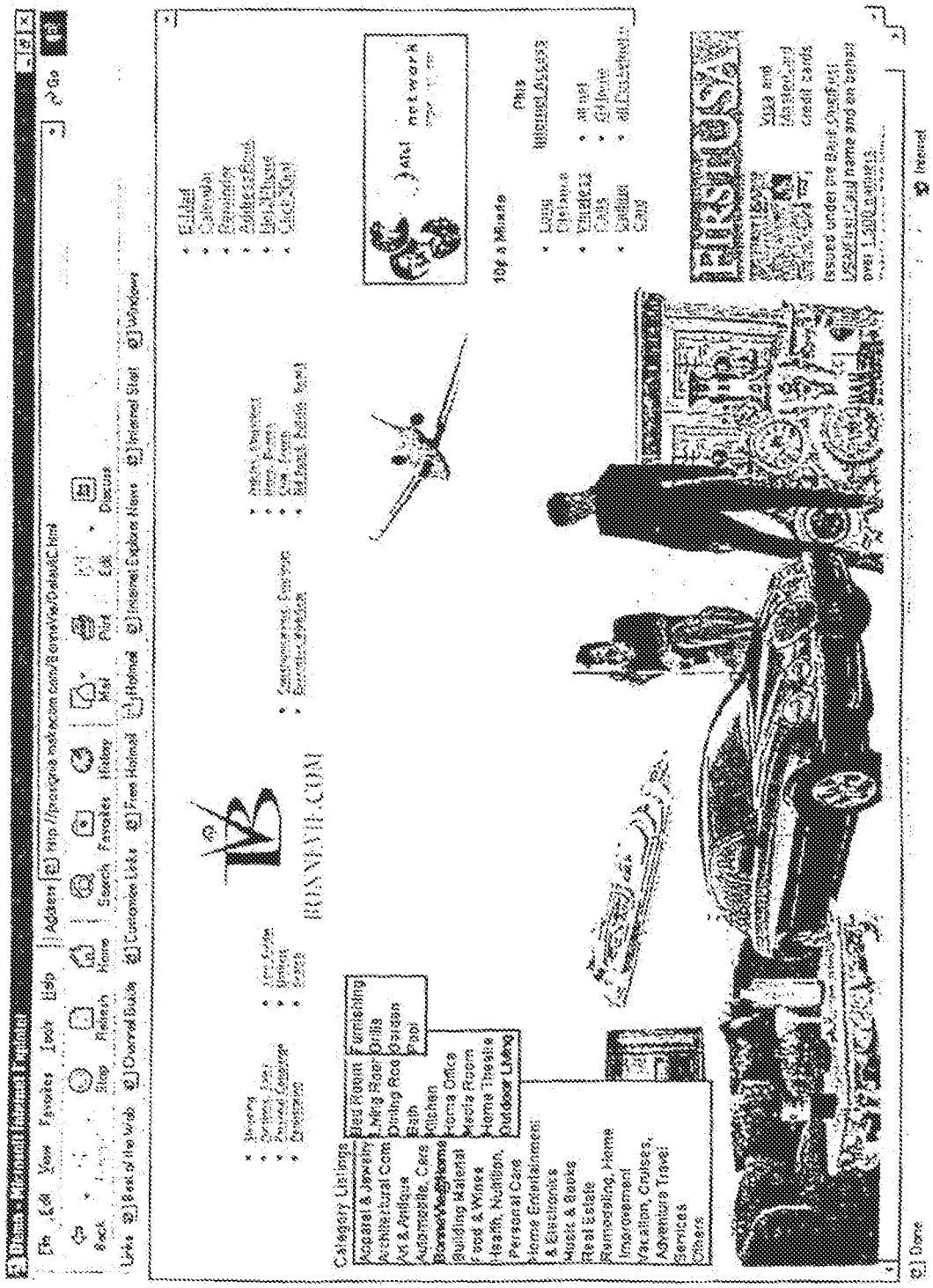
Figure 6-D

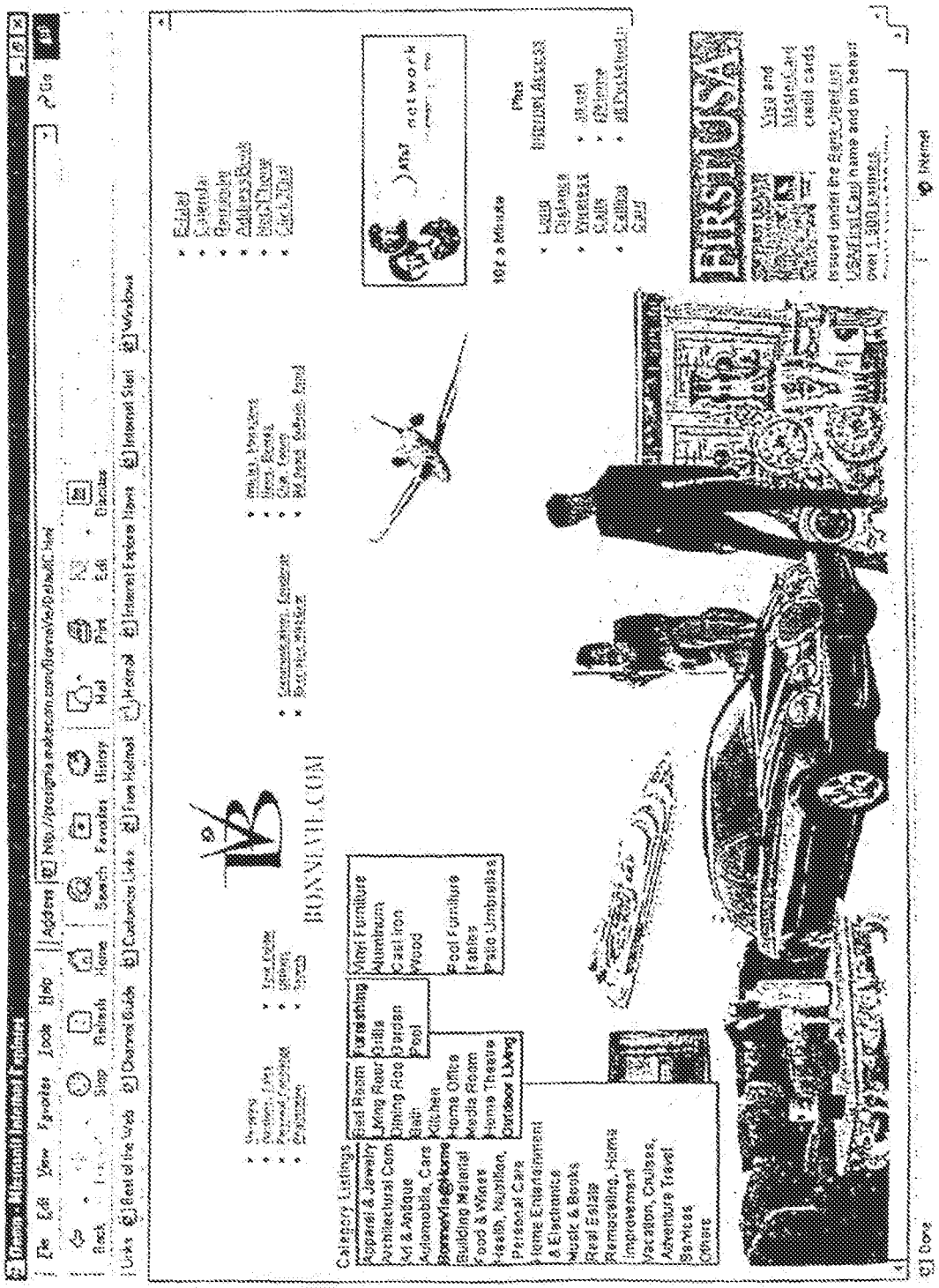
Figure 6-E

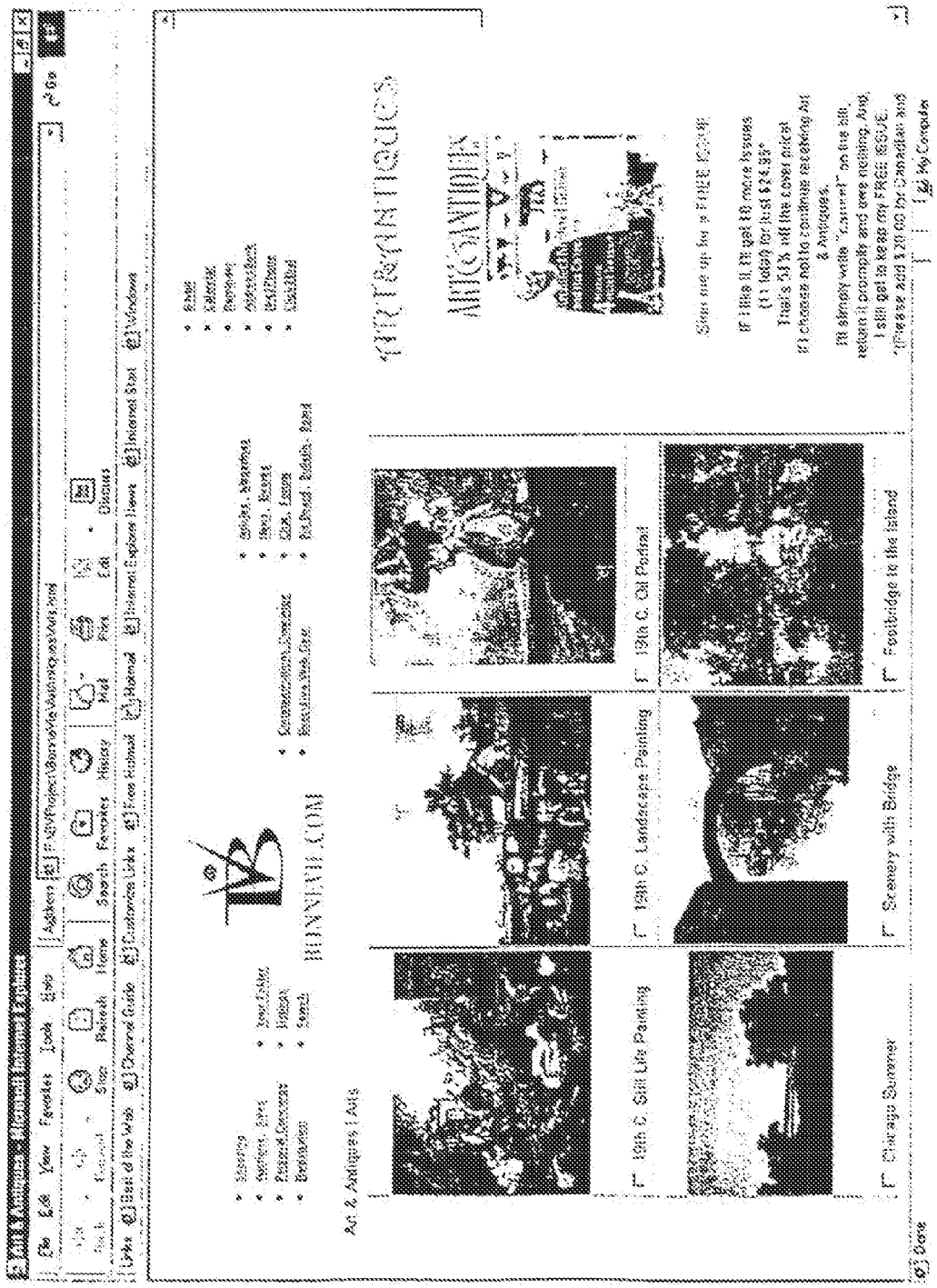
Figure 7-A

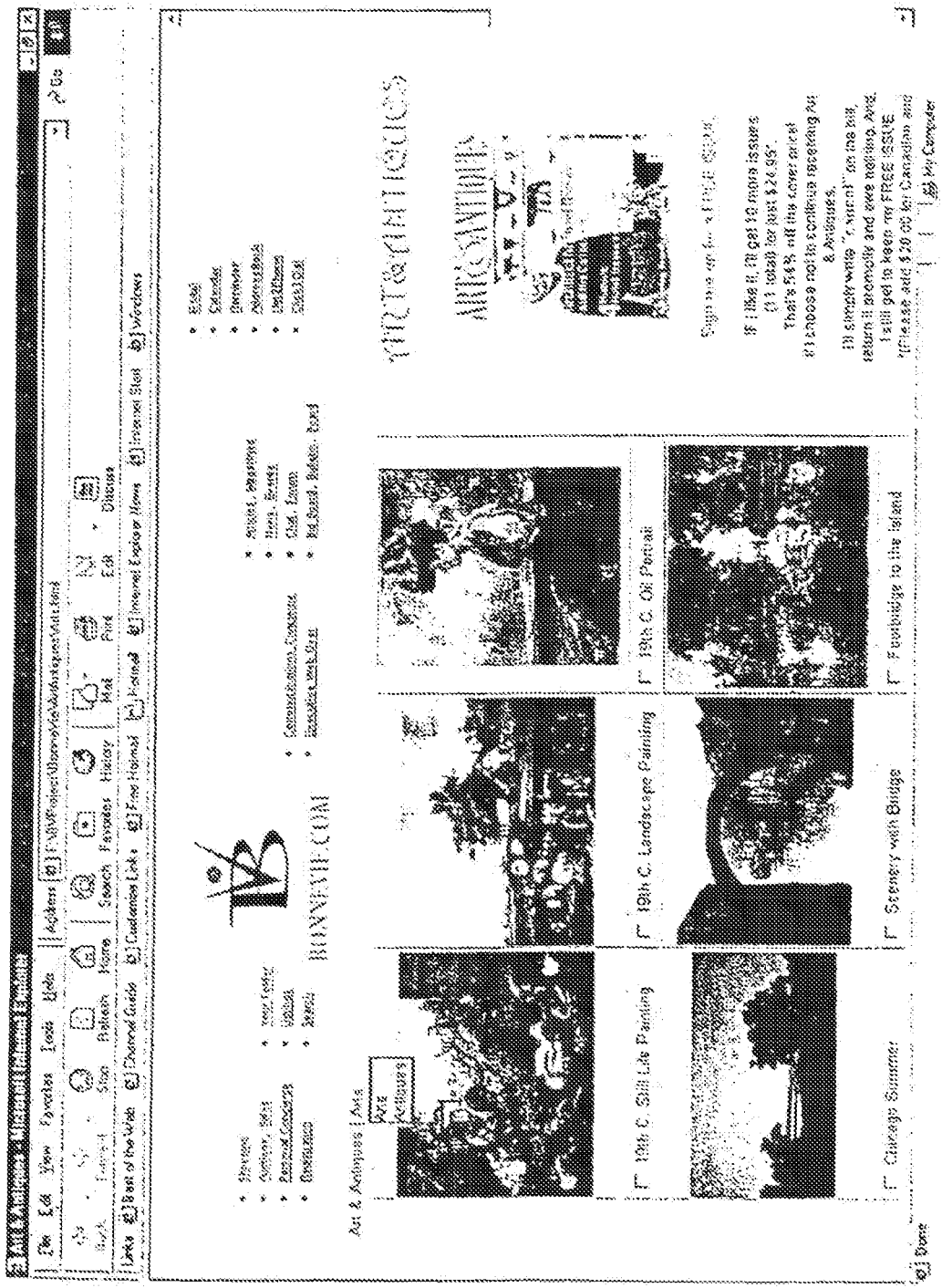
Figure 7-B

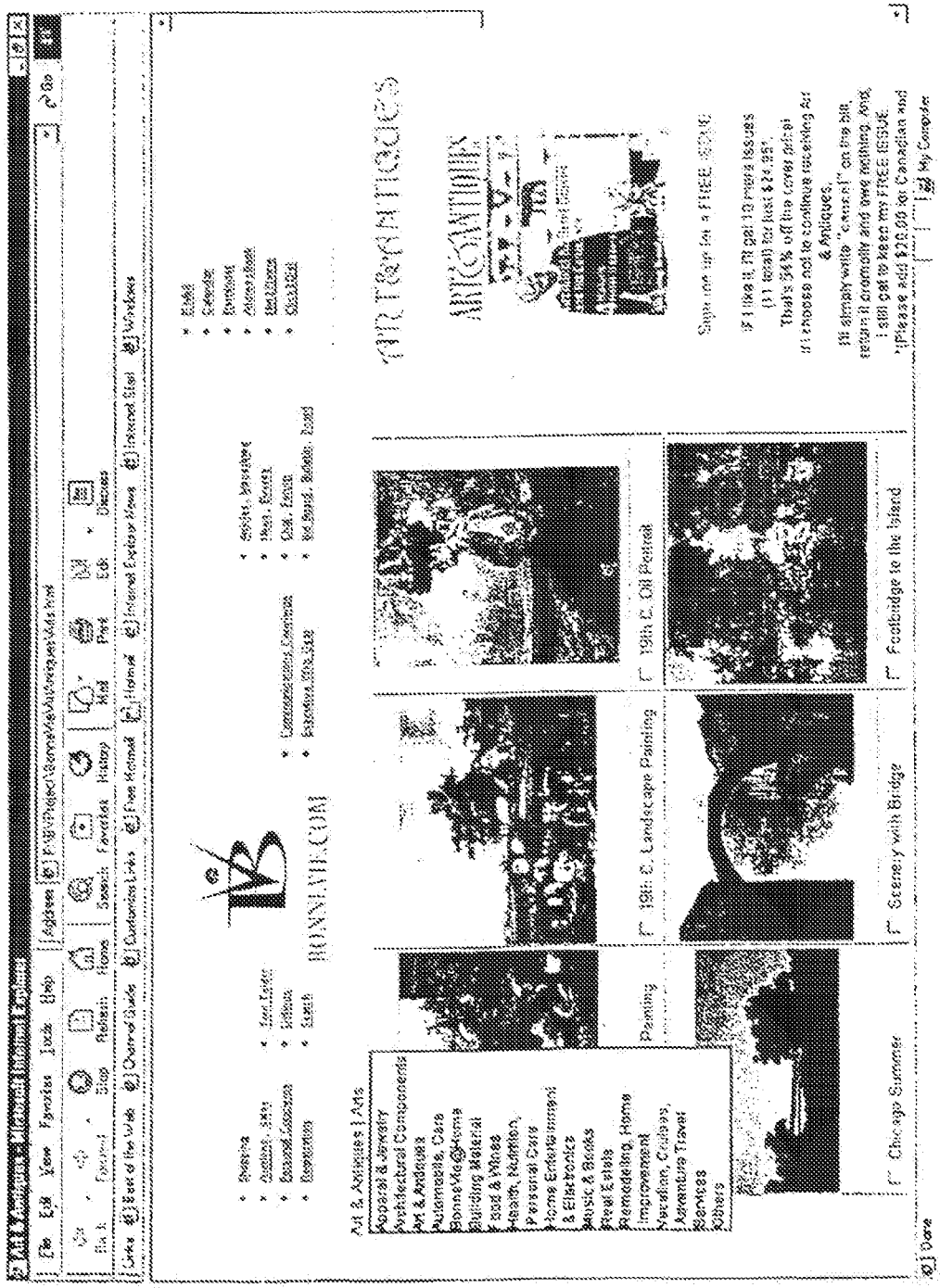
Figure 7-C

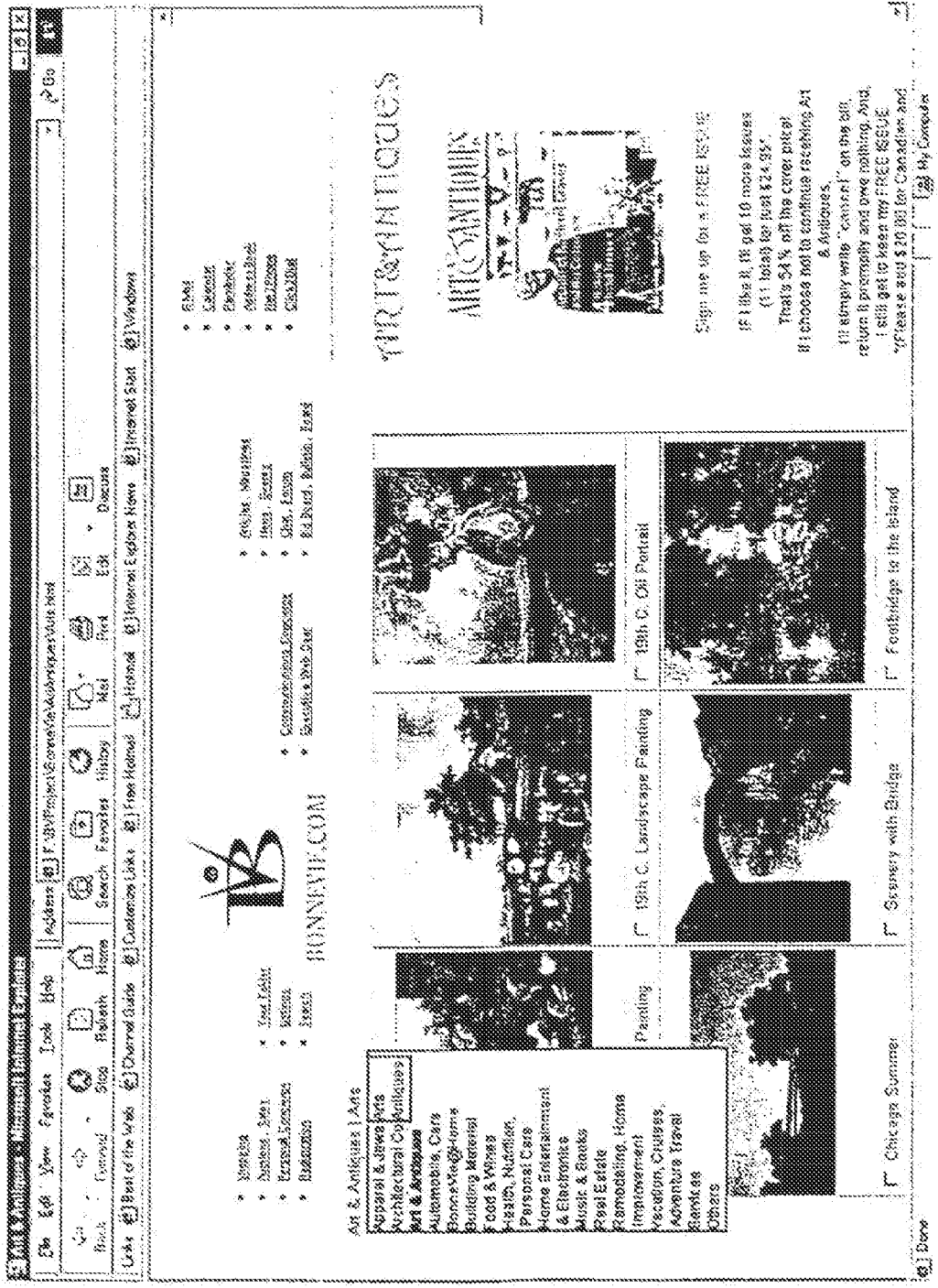
Figure 7-D

Figure 7-E

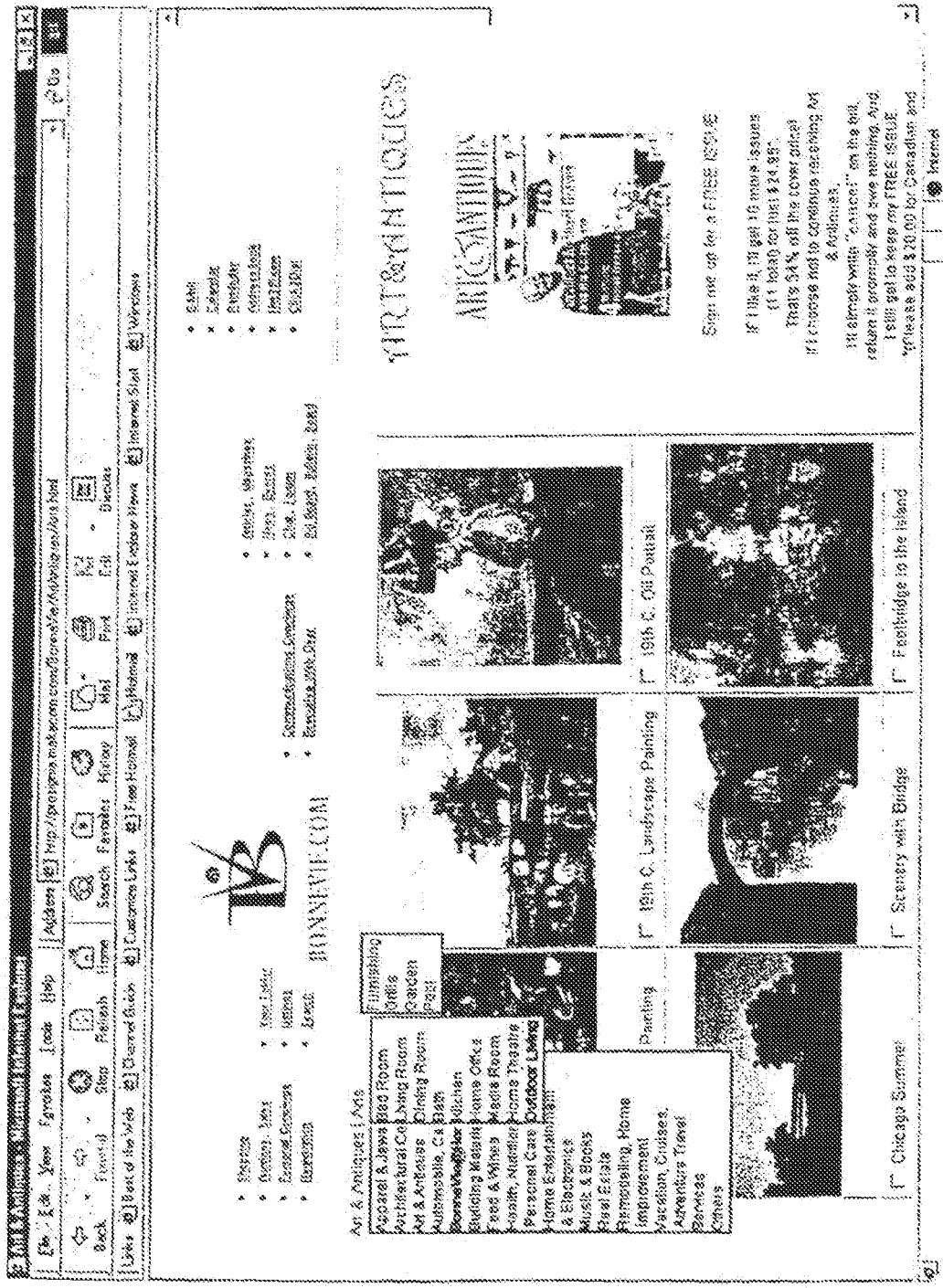
Figure 7-F

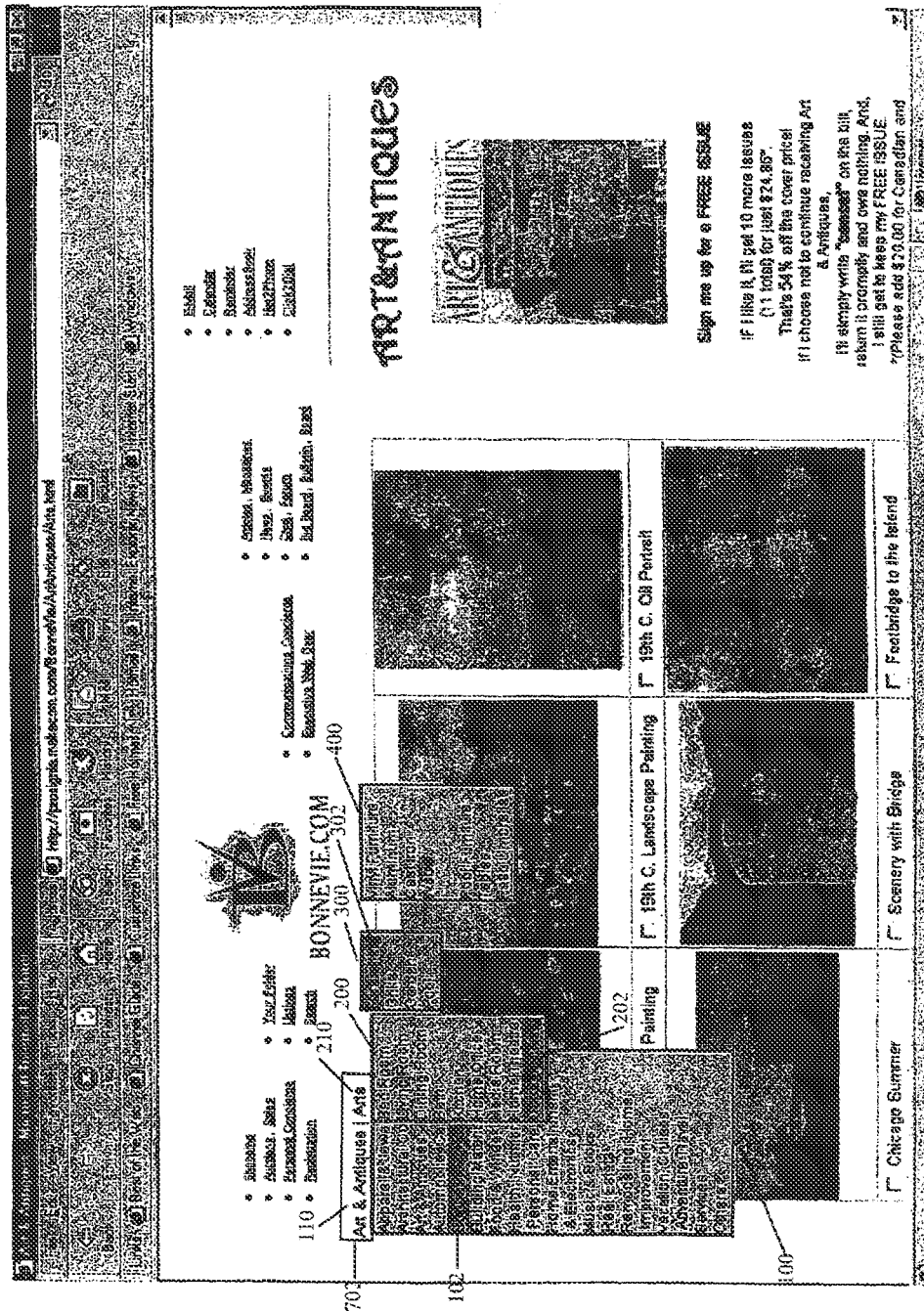
Figure 7-G

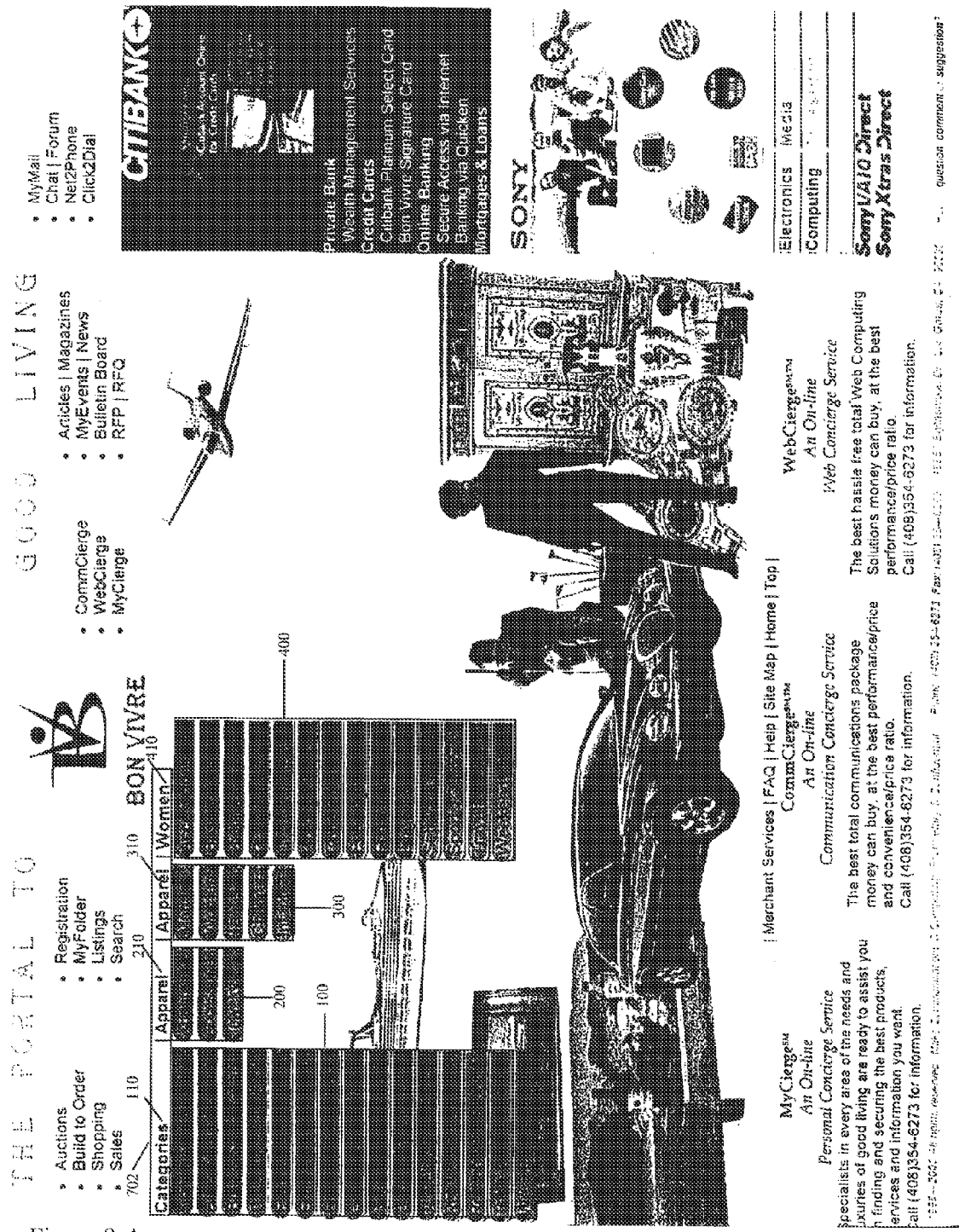
Figure 8-A

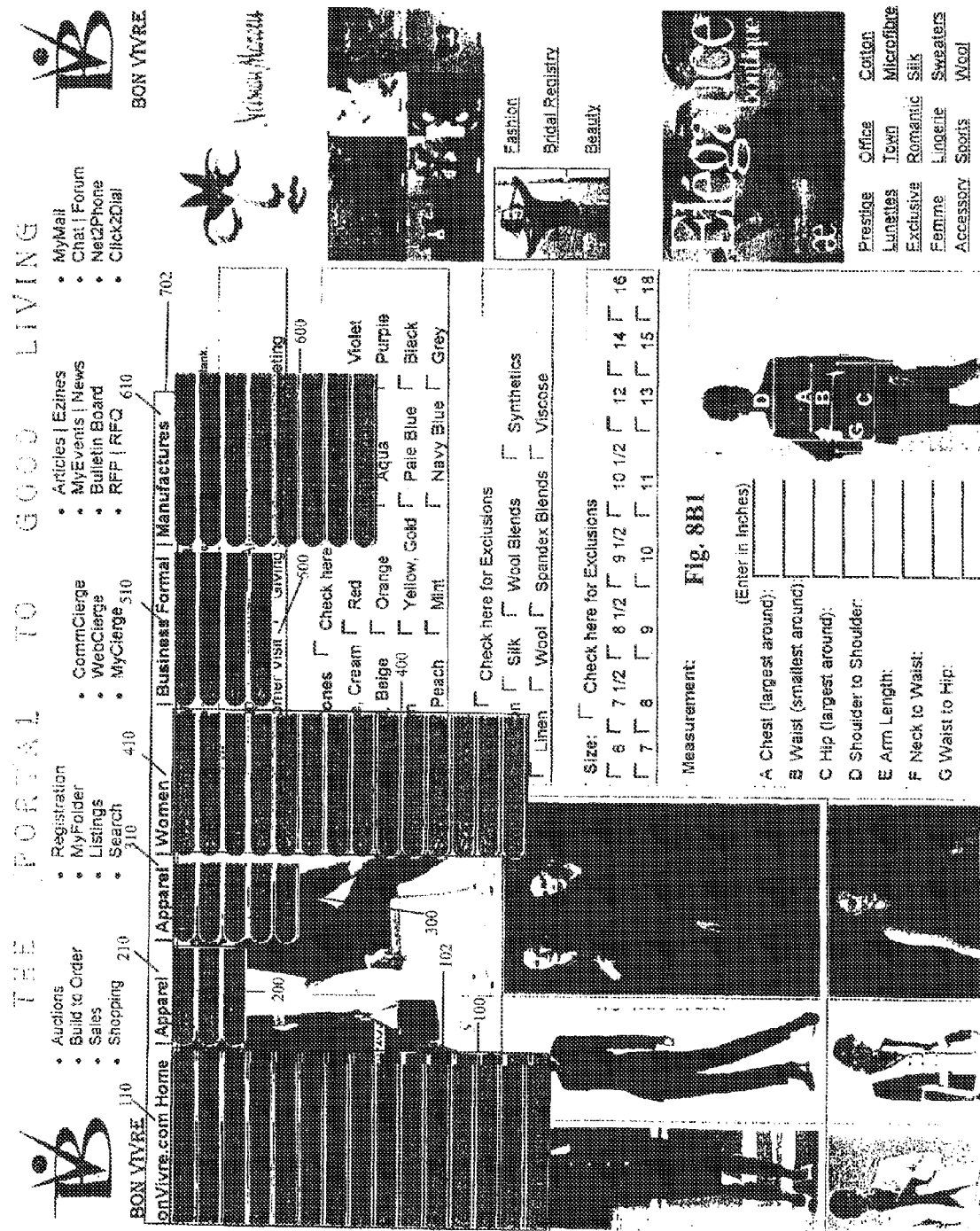
Figure 8-B-1

Figure 8-B-2

METHOD AND SYSTEM FOR ONE-CLICK NAVIGATION AND BROWSING OF ELECTRONIC MEDIA AND THEIR CATEGORY STRUCTURE AS WELL AS TRACKING THE NAVIGATION AND BROWSING THEREOF

PRIORITY NOTICE

This Non-Provisional application claims the benefit of the May 24, 1999 filing date of Provisional U.S. Patent Application Ser. No. 60/136,149.

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever.

BACKGROUND OF THE INVENTION

1. Field of the Invention

The present invention relates to methods and apparatus for navigating electronic media. The present invention allows the browser to browse through the nested categorization structure before committing to invoke a link to call for particular content pages listed under a particular category. In the prior art, only one level of categories can be view in one category listing webpage. The next level's categories under any particular category at that level is accessed by invoking the link-token of the category by clicking on the category title, and download the next page where the next level category titles are listed. This results in loading many intermediary pages, going back and forth to search for the interested category and the related content.

The present invention also relates to a dynamic tracking-string/tracking-device that embeds the category browsing apparatus. Thus allowing browsers to dynamically examine and pursue other browsing paths, and to arrive at new destination content with a single mouse click and a single page-download. The present invention enables the browser to return to, or arrive at any page at any previous or forward-branching point at any categorical level, from any page at any level of the categorization structure.

2. Description of Related Art

The application of hyper text mark up language (HTML), scripting languages, such as Java, Common Gateway Interface (CGI), Practical Extraction and Report Language (PERL), Visual Basic Script Language, VB (Visual Basic) Script, and derivatives thereof, other languages, markup languages, or meta-languages, such as the Standard Generalized Markup Language (SGML-ISO 8879), eXtensible Markup Language (XML), Cascading Style Sheet (CSS), and Java Speech Markup Language (JSML), allows the static and dynamic linking of computer stored objects (texts, graphics, icons, parts, items, lists, audio and video segments, etc.) from a container of objects to related information and/or other objects and containers via software link-tokens. A link-token is an addressing pointer, pointing to the memory location of the link destination). A link-token is usually represented by an underline, bolded text-string or a symbol, a bullet, an icon, a graphical thumbnail, a graphical text-string or a symbol etc., and can only be invoked one at a time from each electronic media "page," An electronic media "page" has a single and unique URL (Universal Resource Locator) address. It can physically be less, equal to, or more than one or many conventional 8½" by 11" printed paper page.

When a link-token associated with a particular object is selected and invoked, for example, by clicking a computer "mouse" button while the pointer is resting at the object, the destination object that is linked by this particular link-token is brought forth from the database or memory bank in the connected storage media addressed by the link-token, and presented for viewing or examination by browsers, i.e., humans, devices, or computer software.

However, on each predefined page of such electronic media where many objects and link-tokens are present, only one link-token can be invoked (clicked) at a time from one web-page to bring forth the particular web-page addressed by the particular link-token invoked. If additional objects from the starting page are of interest, one must return to that page, with as many click-and-waits on the "back" button, as the browser has already clicked forward on the current path. Once back there, only one single selection of links can be made and "clicked" to bring forth the next level content page linked. Moving forward and backward between pages of media linked by the link-tokens in this manner is a slow and labor-intensive procedure.

The viewing and examination of such electronic media is organized by categories. Only the top-level categories and at some instances, some of the associated second level categories are listed on the first actionable starting page, the home-page. From any page that lists multiple category titles for selection, only one category title can be selected, and only one action can be made: to bring forth the one page that particular category title points to, usually the next level categories listed under that particular category title.

The information the browser actually desires to view is often several levels away. The browser thus make one click on one category at a time, loading one page listing the next level of category titles, and repeating the process until the desired category is finally reached to be clicked and linked to the content page. The trade-off that can be made is between the number of categories listed at the same level, versus how many levels of categorization.

Some websites list the first level of categories on the home-page, and the next level categories under each first level category on their respective subsequent linked page. The third level categories under each $2^{nd}$-level categories are listed in the respective subsequent third level page, and so forth. A browser must follow a certain category path by common sense over several click-and-wait path. If the path yields no desirable result for information sought, or if the browser wishes to examine another category branch several links and levels back, the browser must return to that branching level, repeat the process until the interested information is located and reached.

To track the browsing path and facilitate returning to the previous pages along the browsing path, some websites list in a string the URL link titles along the browsing path, and requires the browser to click and download a web page along the path to view a sub-category listing under that particular category along the current browsing path. To examine the sub-categories under another category at that same level, the browser must find, select and click that category, and download a web page that lists its sub-categories, and so forth. Examining many categories at the same level and branching to other paths with the prior art would require clicking forward and backward numerous times, and each time waiting for a page to download.

The state-of-the art of category-assisted browsing and the tracking scheme from the most advanced sites are described in FIG. 1 through FIG. 5. While these various category-assisted browsing schemes are superior than most other smaller or lesser sites in that they all attempt to reduce the number of total levels the viewers/browsers much click-through and download to reach the intended content, they all trade off between having a larger number of categories at each level to reduce the number of levels a browser must click through. Each of these schemes also in someway presents a select partial listing of the next level categories under each current level category. As shown in FIGS. 1B1 through 1B2, ebaY.com combines the $2^{nd}$ and the $3^{rd}$ levels immediately after a primary category on the home-page is clicked. As shown in FIG. 2A, Yahoo lists the primary ($1^{st}$) level categories arrayed across the home-page, and a small number of selected $2^{nd}$ level categories listed under each primary level category. As shown on the left side of FIG. 3A, Homeportfolio, a state-of-the-art site showcasing high-end home furnishing products, uses a combination of minimizing the number of levels (by increasing the number of categories in each level), as well as giving an option for "category search," where the entire unstructured category titles can be linearly alphabetically scrolled through a small viewing box. As shown in FIG. 4A, AOL.com lists $1^{st}$ and $2^{nd}$ level categories on the home-page, with a small number of first level categories, and a large number of $2^{nd}$ level categories in a column format. As shown in FIG. 5A, Spiegel, a department store website, lists the primary "shopping" categories on the leftmost column of its shopping page. As shown in FIG. 5B, the $2^{nd}$ level category titles of a particular primary category title would appear under the category when it is selected and clicked. The remaining primary level category titles are pushed lower on the column. The detailed mechanisms of these schemes are described in the following sections.

ebaY.com's category browsing is illustrated in FIGS. 1A through 1D. The home-page is shown in FIG. 1A, with primary (first level) categories listed on the left side of the page. As an example, we selected the "Collectibles" category, by using the mouse to move the cursor to rest at that text-string. The only thing one can do after that is to click the left mouse button to commit to the selection, which brings forth FIG. 1B1, a 6 physical-page length listing of the next two levels of categories under "Collectibles." The list is alphabetically arranged, first column on the left downward from "A" on FIG. 1B1. The second column begins with "H" on FIG. 1B1. The list is very large and requires considerable effort to view or to comprehend. However, the number of levels is minimized, so that it does not become too annoying to the browser to have to click and download too many times to reach the desired category. The gain is obtained at the cost of cramming an incomprehensibly large number of category titles at each level, and an even larger number of content items under each category title. As an example, we click on the $3^{rd}$ level "Golden Age" category under the second level "Comic Books" category on FIG. 1B42. The download result is shown on FIG. 1C, which contains the next level ($4^{th}$) categories: "General," "Superhero," "Crime," "Horror/Sci-Fi," and "Funny Animals;" a list of 8 "featured items," and a long list of 2620 Golden Age Comic Books, which takes more than 52 web-pages (as indicated on FIG. 1C) to display.

ebaY.com's "tracking-string/tracking-device" is shown at around one quarter down from the top of this first physical page of the first web-page from the more than 52 consecutive web-pages listing the items under the "Golden Age" sub-category of the "Comic Books" category. The tracking-string/tracking-device is as the following: "Top: Collectibles: Comic Books Golden Age," with "Current Auction" under the string. The "Top" contains a link to return to the home-page FIG. 1A. The "Collectibles" contains the link to return to the "Collectibles" page, FIG. 1B1. The "Comic Books" contains the link to return to the Comic Books page. The "Golden Age" is the current page, thus unlinked.

We then click the "General" category on this page (listings under the Golden Age category), and parsed the 2626 item list down to a 1360 item list that still will take more than 28 web-pages to display as shown on FIG. 1D1.

Yahoo.com's category browsing scheme is illustrated in FIG. 2A. The primary (first) level categories and a few selected $2^{nd}$ level and occasionally $3^{rd}$ level categories under each primary category are shown on the homepage in FIG. 2A. For example, under "Business & Economy" category, three sub-categories: Companies ($2^{nd}$ level), Finance ($2^{nd}$ level), and jobs ($3^{rd}$ level) are listed. By clicking on "Business & Economy" category, one brings the link-destination page, with 36 second-level category titles listed under "Business & Economy." Clicking on the "Employment & Work" ($2^{nd}$ level) sub-category, the destination page is brought forth, listing 28 third level categories. Clicking on the "Jobs," $3^{rd}$ level category brings the link-destination page, listing the 6 sub-categories ($4^{th}$ level), and Internet job sites. Clicking on the "Company job Listings" brings a listing of 358 links to company job sites in alphabetical order. The "tracking-string/tracking-device" is presented only on the very top of the $1^{st}$ physical page of this very long web-page. The tracking-string/tracking-device reads: "Home>Business and Economy>Employment and Work>Jobs." The $2^{nd}$ line of the tracking-string/tracking-device indicates the current page category title: "Company Job Listings." A browser can click on the "Employment and Work" link on the tracking-string/tracking-device to return to that category page, and select another sub-category, for example, the "Career Fields," by placing the mouse on "Career Fields," and click the mouse button. A page would be brought forth from the remote site-server to show an alphabetically ordered list of career fields. Clicking on "Financial Service" downloads a listing of the next 5 sub-categories. Clicking on "Individual Resumes" downloads a three-physical-page web-page showing 79 names of individuals who post their resumes under the "Financial Services" category, and the links to the resumes.

Similarly, in Shopping.Yahoo.com a "Kitchen Appliances" category is reached after 4 clicks and 4 page-downloads, showing the 29 fifth level categories. There are yet at least two more clicks and two more page-downloads to reach specific information of a desired item.

The Homeportfolio.com's category browsing is illustrated in FIGS. 3A through 3HB. The shortened "quick start" category list is given on the mid-left section of the home-page as shown in FIG. 3A. An unstructured category list is accessible via the small "category search" box located at the end of the content on the left side of the home-page. When the downward triangle on the right side of the small box is clicked, a somewhat longer box with a scroll bar appears, with an alphabetical listing of category titles. Scrolling the scroll bar causes the long category list of 158 titles as shown on FIG. 3B to slide by the "box" for viewing. When the correct category is found, a click on the category would bring the web-page containing the items listed under that particular category onto the display screen from the remote site-server. The Homeportfolio method enables the browser to pick an exact category from the start, so that a page containing the items under that category can be reached without many steps of downloading category-listing pages. However, to examine the unstructured list of 158 category titles by scrolling the list through a small window, can not be said to be less annoying than having to download several hierarchical category-listing pages, one-level at-a-time. To illustrate the hierarchical category browsing, we click the mouse button when the cursor is rested on the "Furniture and Home Furnishing" category as shown in FIG. 3A. A "product explorer" web-page is downloaded from the Homeportfolio remote site-server, containing two types of category titles. Moving the cursor to the "Living & Family Room" category and clicking on the mouse-button downloads a page listing the eight $2^{nd}$ level category titles. Clicking on the "Furniture" category title on this page causes listing of the 14 sub-categories under "Furniture." Clicking on the "Coffee Table" category on this page brings a list of the number of Coffee Tables present on the site from each manufacturer. There are 4 pages of the 96 item Coffee Table thumbnail list. The enlarged graphics and detail descriptions are viewed one at a time. Graphical thumbnails are small images frequently used in on-line or other computer viewable recording media (such as CDROM) to represent objects that are best represented by images. The thumbnail and the underlined text-title represent the same link that links the thumbnail and the text title to the larger graphics and the more detailed descriptions of the item.

America On Line, AOL.Com's category assisted navigation is shown in FIG. 4A. The AOL home-page shown in FIG. 4A has four primary categories: Web Centers, Shortcuts, Shopping, and Community. The next level categories are accessible and organized under these primary categories in four columns. Each of the primary categories also has a link token that links to a page listing the $2^{nd}$-level sub-categories shown in the home page, along with some other advertising and promotional information. Clicking on any of the categories listed in the "SHOP BY CATEGORY" section, download a page listing logos and banners with links to the on-line stores linked to AOL under that category and a repeat of the "SHOP BY CATEGORY" section.

To illustrate AOL's process, we move the cursor to "Apparel," and click on the left button of the mouse. The action brings a page containing banners of various AOL linked on-line stores selling apparel products. Each banner has a link-token linking to the store's independent web-site off the AOL.Com site. Using the mouse to slide the cursor to the "Harold's" banner, and clicking on the left button of the mouse, causes a page to be downloaded to the browser screen from the "Harolds.Com" site-server. Harold's categorization scheme takes over from that point. To find clothes to buy, one needs to click on the "shop now" link A new page is downloaded to the browser's computer from the site-server, and the Harold's shopping categories are shown. If the shopper is looking for men's clothes, move the cursor to "MEN'S" category, and click the mouse button. A new page is downloaded from Harold's site-server. If "Sportcoats" is of interest, bring the cursor there, and click the mouse button, then thumbnails of three selections are shown. To see any one of the three selections, one must move the cursor and click the mouse button again, on one, and only one of the three selections. If the cursor is moved to the black sports coat show on the top, and the mouse button clicked, a web page is downloaded to the screen from the site-server. If the shopper wants to see another one of the three selections, the cursor must be moved to the "Back" icon on the browser frame, and the mouse button clicked to bring back the page with the three selections and the process repeated.

If the shopper decides that none of the three sports coats catches his fancy, and wishes to see some other stores, the best thing for him to do is to enter www.aol.com into the "Go to" box on the browser frame at the top of the screen, to return to the AOL home-page. It would require too many clicking on the "Back" icon, and much waiting between each click for the downloading of the intermediary pages, to return to the "Apparel" page. To explore the AOL process further, let us move the cursor to "Auctions" or "Department Stores" under "Shopping." A web-page is downloaded from the AOL site-server, with banners of various on-line auction or department store sites, and the "SHOP BY CATEGORY" section on the lower half of the page listing the primary shopping categories. Each banner represents a shopping site linked to, but off the AOL site. When a banner is clicked, the browser exits AOL site and begins downloading the home-page of the particular site the clicked-banner is linked. The category structure is that of the banner site, independent of AOL, such as Harolds.com store and of the Spiegel.com store.

Spiegel.com shown in FIG. 5A, a well acknowledged on-line department store listed in AOL Shopping's "Department Stores" category, uses only two category-levels for its on-line shopping functions. The left column shown in FIG. 5A of the web pages is used as a partition to list its first level categories and the $2^{nd}$ level categories of a selected first category. The second level category under a specific category appears, when that specific category is "clicked." As shown in FIG. 5B. If another $1^{st}$ level category is subsequently clicked, the first set of second level categories disappears, and the new set appears under the subsequently clicked category. The number of each set of the $2^{nd}$ level categories is large, but not as large as that of some of the ebaY.com's categories. There is no third level category under the $2^{nd}$ level categories. For example, when the "Accessories" (or "Fine Jewelry") category is clicked, the web-page containing all merchandise categorized under "Accessories" or ("Fine Jewelry) is downloaded. Clicking on a thumbnail downloads the larger picture and detailed description of the item. This scheme functions reasonably well when the number of items under each $2^{nd}$ level category is not large. Ideally, in a fully functioning on-line department store, there should be hundreds or thousands of items in the "Accessories" category, making sub-categorization under "Accessories" a necessity. In such situations, the Spiegel scheme is not usable. As the site is further reviewed, it is found that there are invariably very few items under each second level category.

SUMMARY OF THE INVENTION

The present invention is related to an intelligent, convenient and time-saving method and apparatus to browse electronic media by clicking only once from a nested cascading category structure, without repeated, unwanted and unneeded intermediary downloads for category listing pages, as required in the prior art. The present invention also relates to easy pre-browsing of the category structure, rolling from category to category to view each category's sub-categories, and back and forth from level to level without having to click any one category and download its next-level category listing pages. With the present invention, the viewer/browser clicks only once to download precisely the content page of interest after at any point during the examination of the category structure and category titles, at any hierarchical level of the category structure.

The present invention also relates to a dynamic tracking device, which can be represented by a text-string or a string of graphical symbols, with an embedded nested/cascading/roll-over category browsing apparatus of this invention, to facilitate an efficient way to return, move, forward, and/or change path during browsing and examination of electronic media, or to easily review more than one path along the categorical structure. The invented method and apparatus advances the state of the art, and significantly improves the method and processes of exploring, viewing, and examining electronically recorded media.

The prior art on the other hand requires the browser to click and download a new web page to view a sub-category listing under a particular category along the current browsing path at a certain hierarchical level. To examine the sub-categories under another category of the same level, or at a different level, to consider browsing a different path, the browser must select, click, and download back and forth numerous times to see each level of subcategory listing under each category. Examining many categories at the same level or at different levels using the prior art would require innumerable clicking forward, backward, and download waiting cycles, costing time, labor, and computing and data transmission resources.

BRIEF DESCRIPTION OF THE DRAWINGS

Figure 1:
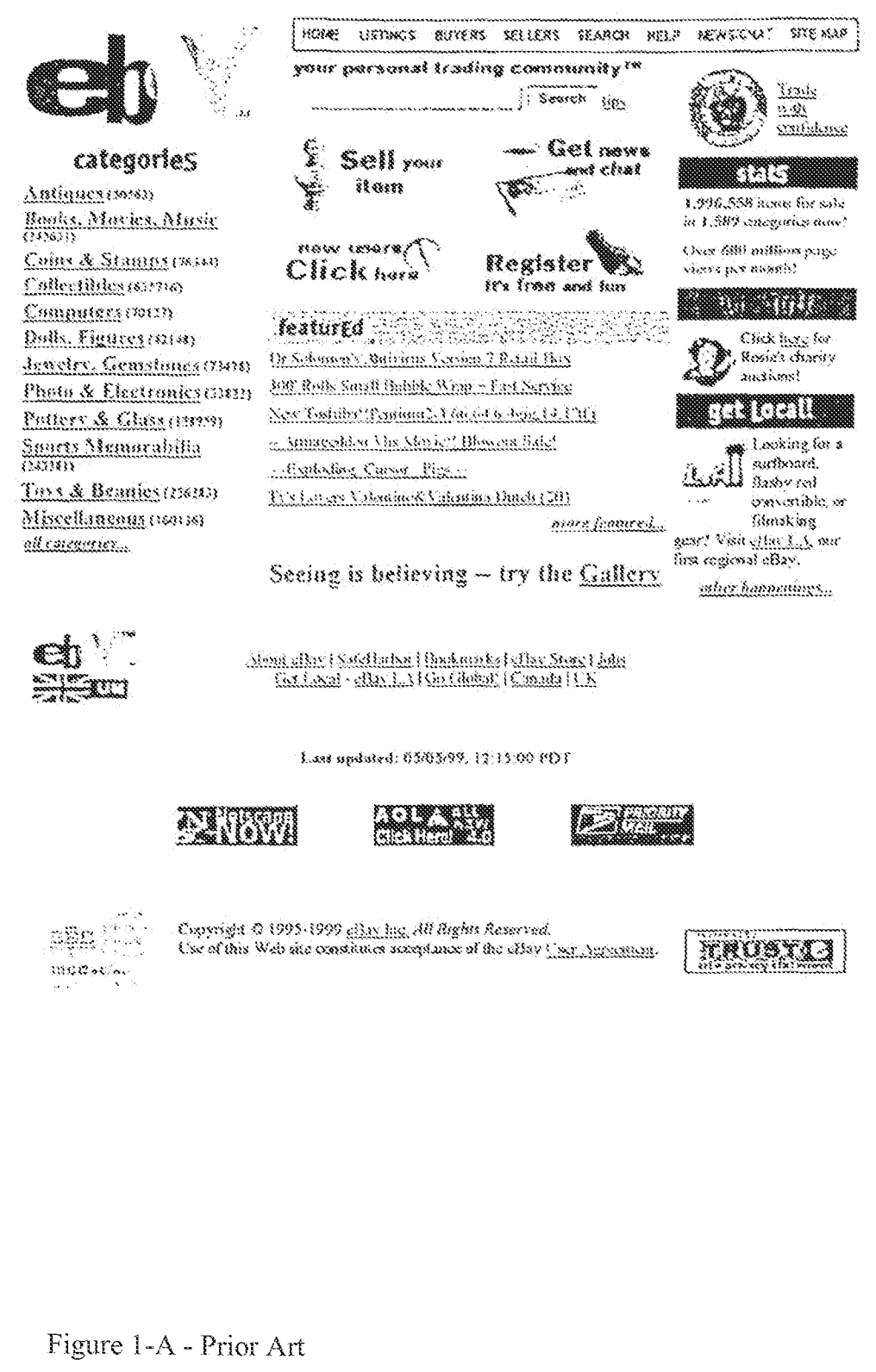
Figure 1:
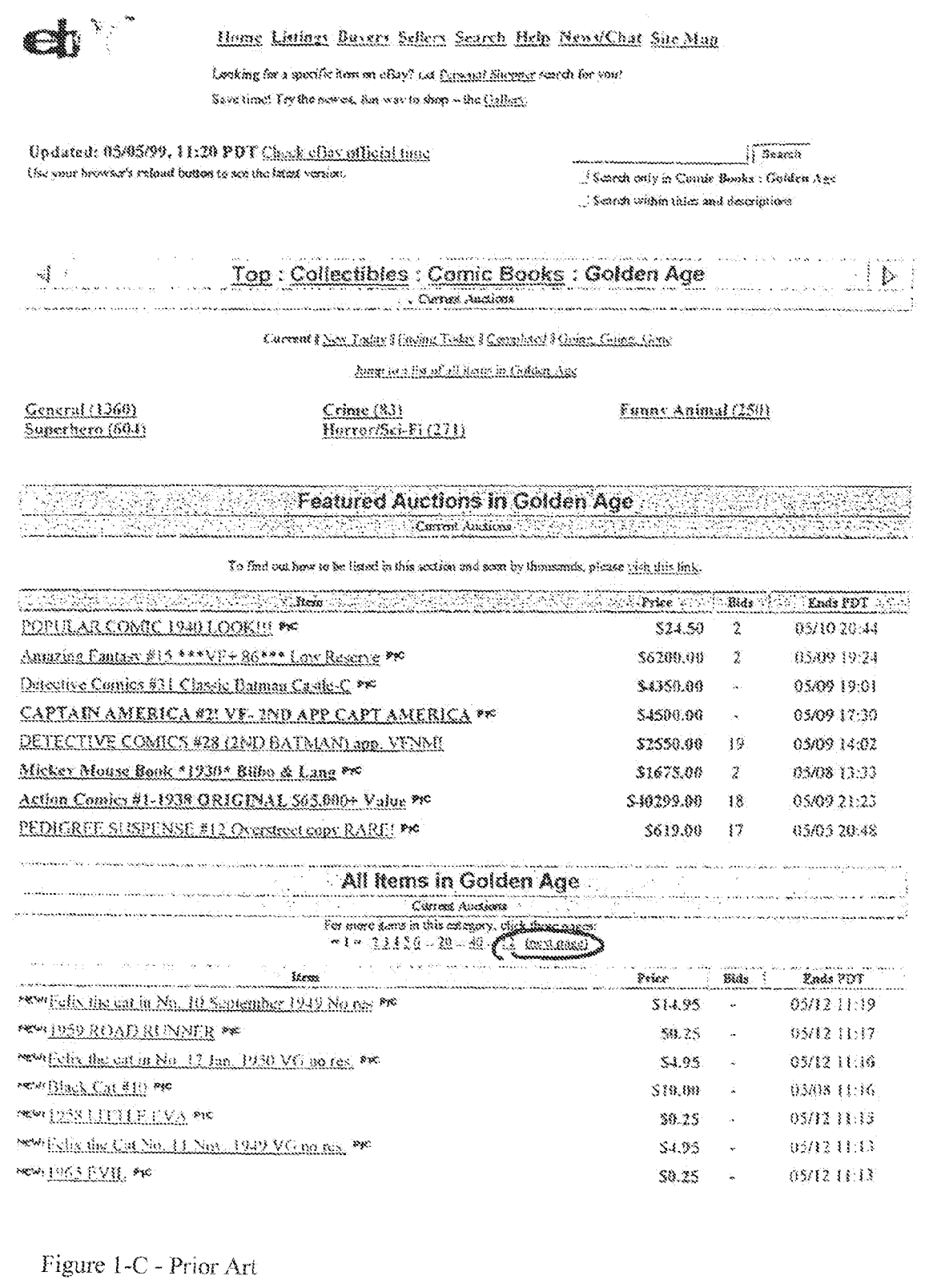

FIGS. 1A through 1D describe ebaY.Com category assisted browsing scheme.

FIG. 2A describes Yahoo.com category assisted browsing scheme.

FIGS. 3A through 3B describe Homeportfolio.Com category assisted browsing scheme.

FIG. 4A describes AOL.Com category assisted browsing scheme.

FIGS. 5A through 5B describe Spiegel.Com category assisted browsing scheme.

FIGS. 6A through 6E illustrate the dynamic one-click nested cascading category browsing method and apparatus of the present invention.

FIGS. 7A through 7G illustrate the dynamic tracking-string/tracking-device with embedded nested-cascading category browsing apparatus of the present invention.

FIGS. 8A through 8B2 illustrate another implementation of dynamic one-click nested cascading category browsing method and apparatus of the present invention.

DETAILED DESCRIPTION OF THE EMBODIMENT OF THE INVENTION

Described is a method and apparatus for browsing the category structure of a web site independently of the media pages thereby bypassing the repeated, time-consuming page downloading for viewing sub-category titles required in the prior art. Also described is a method and apparatus to assist browsers to easily explore different categories and browsing paths along category trees, without the time consuming, repeated page downloading and "clicking back and forth among web pages of different categories, and between different levels of categories on the category tree as required in the prior art.

The invention enables content provider to organize the electronic media under meaningful and sensibly sized partitions and levels, nested and cascading category titles. The invention further maintains the categorization titles and structure in textual format, and as a complete entity of its own, with or without parsing portions of the category structure to embed into various content pages. In the present invention, categorization structure is organized according to user friendliness, without need to include a very large number of categories in one level, in order to reduce the number of levels in the category structure, to reduce the number of click-and-wait cycle, as required in the prior art. The categorization titles and structure of the current invention is organized, stored, and presented economically an efficiently. The titles and their structural relations can be delivered to any or all content pages, but separate from the rest of the media content present on the pages.

The category structure of the present invention, although resides with the web-pages, does not need to be displayed on the computer viewing screen with the rest of the page content, until specifically called for. The category structure can be browsed and examined in detail, independent of the web-page content. No web-page downloading is required until the browser is satisfied with the browsing and examination of the category structure and titles, and has determined a specific category of interest. Only then the link-token associated with this specific, selected category title need be invoked to initiate the downloading of the content that is specifically related to this particularly selected category. When the cursor is moved away from the category structure, the structure disappears, again hidden from view without disrupting the display and viewing of the rest of the media content on the page.

FIG. 6 shows an example implementation of the present invention, the "One Click" category browsing. FIG. 6A shows an example home-page, with a text-string or a symbol representing the gateway (2) to viewing the category structure, in our example,—"Category Listings" at the upper left of the page content is used as such symbol. When the cursor is moved, or "rolled-over" to that "Category Listing" (2), without having to click the mouse button, the primary category titles (100) appear under "Category Listing", as shown in FIG. 6B. If the browser moves (or rolls-down) the cursor to any one of these primary category titles (102), for example, to "BonneVie@Home" (102) as the selected category, the category titles under "BonneVie@Home" appear to the right of the primary category titles (200), without clicking action or any downloading from the site-server, and "BonneVie@Home" (102) is highlighted as shown in FIG. 6C. When the cursor is "rolled-over" to one of these $2^{nd}$ level categories (200), for example, "Outdoor Living," (202) the "Outdoor Living" becomes highlighted, and another list appears to the right of the $2^{nd}$ level category list to show the $3^{rd}$ level category titles (300) under the "Outdoor Living" category as shown in FIG. 6D, again without clicking or downloading from the site-server. FIG. 6E shows another level of "rolling-over" the cursor to the "Furnishing" (302) sub-category organized under the "Outdoor Living" category (202). The "Furnishing" category (302) title becomes highlighted, and the next level category title appears (400). Thus progressing, until the desired level, or the last level of categorization is reached. Furthermore, if the browser wishes to examine different browsing paths before committing to "clicking" for the content, all is needed is to move the cursor to other categories either at the same level or any other level. As the cursor is moved to a different category at the same or different levels, the list of the subcategories of the previous category disappears, the category title itself is "un-highlighted," and the next category where the cursor is presently rested becomes highlighted, and its next-level categories appears. The "rolling" over or forward of the cursor causes the 'next-level category titles to appear, and the "rolling" backward causes the current level and next levels of category titles to appear. Moving the cursor away from the category structure, the entire structure disappears except for the text-string or the symbol "Category Listing"-representing the gateway key (2) to viewing and browsing the category structure.

Without the interference of having to "click and download" at each category and each level to see the next level categories, using the present invention, the organization of the media content can be optimized for user friendliness, rather than for accommodating a tolerable number of "click-and-wait"

cycles as in the prior art. There is no longer reason to include a very large number of items under a category title, or to include a very large number of category titles within a category level, in order to minimize the number of category levels.

At any level or any branching point, the browser can elect to click on the mouse button on a category title to download the entire content pages associated with that category. For example, if the "Furnishing" (302) title is clicked, all outdoor furnishing would be listed and/or described on the page downloaded from the server. If the Vinyl Furniture (402) is selected and "clicked," only Vinyl outdoor furniture will be contained in the page downloaded from the server. If the cursor is moved from "Furnishing" to "Grills," (302) the "Furnishing" sub-category box would disappear, and the sub-categories for "Grills" would appear in the new box in its place. The category title "Grills" becomes highlighted, and "Furnishing" un-highlighted. If the cursor is moved back to "Home Office" (202) of the $2^{nd}$ level category box, the last two levels of lists shown in FIG. 6E would disappear, and a new list would appear to list the sub-category titles under the "Home Office" category, with the "Home Office" highlighted. When the interested/desired category is reached at any level, a mouse click with the cursor resting on that particular category will download from the site-server the web content linked to the link-token of that particular category.

With the present invention the browsing and examination of the categorization structure is facilitated in the most logical and convenient fashion, allowing the browser to roll-over up or down within the same level, or back and forth, between the nesting/cascading levels, until the browser is certain of which category title best fits the information he or she is searching, without having to download intermediary web-pages, level-by-level, and category-by-category, just to view the titles of the next level categories, as is necessary with the prior art. With the present invention, the structuring and the categorization of electronic media can now be optimized for the ease of locating information.

The prior art seeks to minimize the number of levels of categorization, and/or maximize the number of categories listed on one single web page. This is done in order to minimize the number of categorical levels and the associated annoyance of many downloading steps and the waiting periods, as dictated by the prior art. The prior art parses the categorization structure, and embed lower level category titles with the follow-on media content page of the prior level category, displaying both the category titles and the associated or unassociated page content. In so doing, a lower level category can only be reached by clicking the link-token of its parent category, and downloading the follow-on page containing the titles of the sub-categories along with other content of the page. Often, the category titles take up the majority space of the viewable area of the page.

Figure 7:
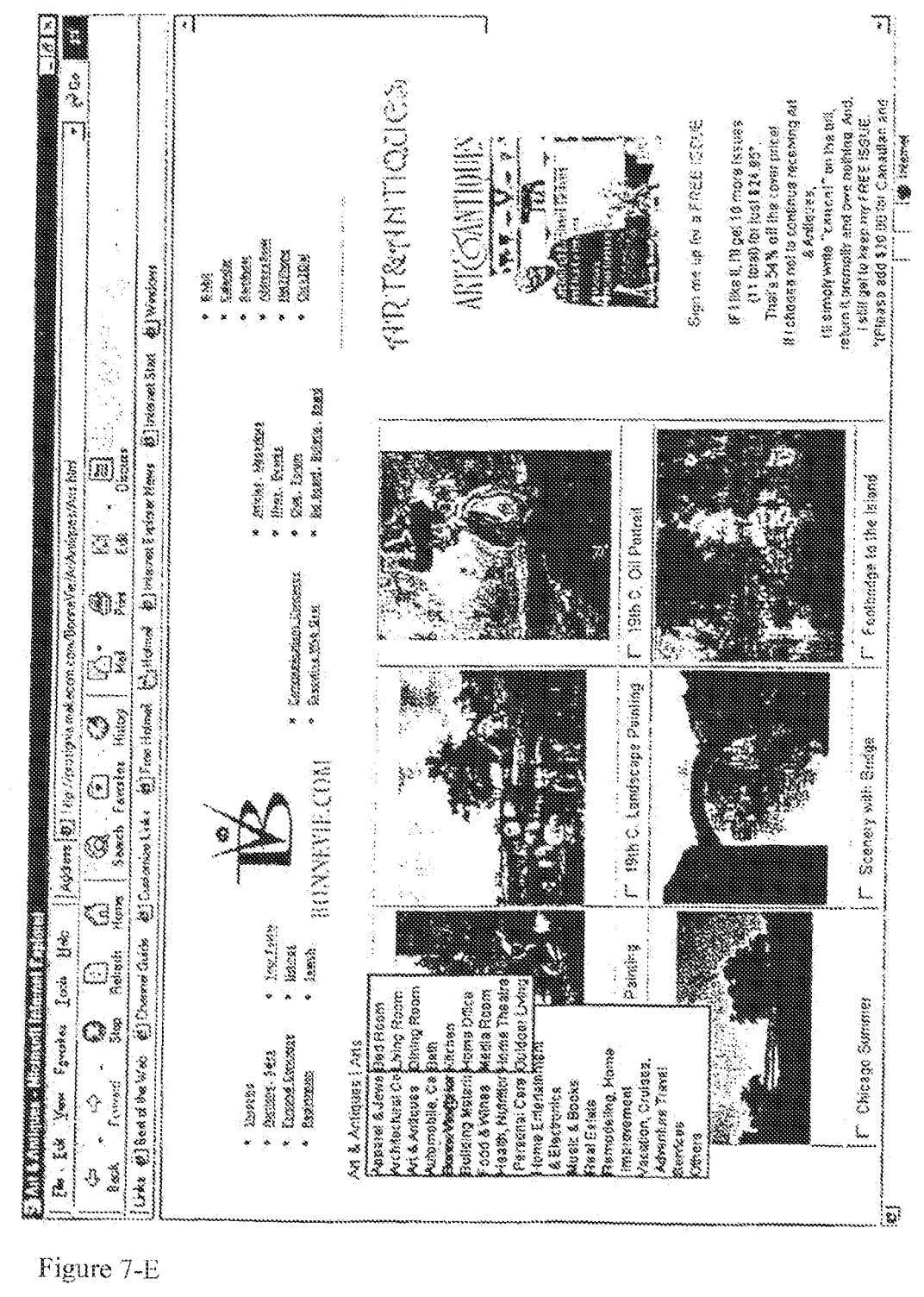

FIGS. 7A through 7G illustrate an exemplary embodiment of the "dynamic" tracking-string/tracking-device" (702) feature of the present invention. Near the top of the page shown in FIG. 7A, is a string of textual titles or a string of symbols indicating the categorical hierarchy of the current web-page (702), starting with either the home-page, or the first level category, and ending at the current page category title. Several advanced web sites contain a static tracking string as described in FIGS. 1C and 1D. The present invention differs from, and advances the state-of-the-art, in that the tracking-string/tracking-device (702) is embedded with a hidden dynamic category browsing apparatus of this invention, as described in detail in FIG. 6, while the prior art tracking scheme is either inactive, or linked only specifically to the pages linked to each category title along the hierarchical category title chain represented by the text-string.

In FIG. 7A, the "Art & Antiques" is the primary ($1^{st}$) level category (110) of the current browsing path, and the page shown is at the Art's branch (210) of that category. The tracking-string/tracking-device above the graphics states: "Art & Antiques|Arts" (702). When the cursor is moved to directly on top of the "Arts" (210) in the tracking-string/tracking-device, the two same-level categories (200) "pop-up" in under "Arts" as shown in FIG. 7B. A Browser can pursue the "Antiques" path (202) and forward, without "clicking" back to the "Art & Antiques" level (110). When the cursor is placed on top of the "Art & Antiques" (110) in the tracking-string/tracking-device (702), the same-level categories (100), in this case, the primary level categories "pop-up" underneath the string (702) as shown in FIG. 7C. The browser can explore other primary category paths (100) while staying on this very page as shown in FIG. 6. For example, if the cursor is moved to the "Art & Antiques" category title (102), the title becomes highlighted, and its next category titles (200) pop-up next to the primary category, as shown in FIG. 7D. If the cursor is rolled down to BonneVie@Home, (102) the "Arts, Antiques"'s next-level category titles disappear, and the next-level category titles (200) for BonneVie@Home pop-up next to BonnVie@Home and BonneVie@Home is highlighted. The apparatus to explore the category structure resides on this very page (and every page, if so desired), with no clicking of the mouse button and no page-downloading required, until the browser identifies the exact level and the exact category of interest. FIGS. 7D, 7E, 7F, and 7G show the "rolling" of the cursor from the primary level category BonneVie@Home (102) to one of its $2^{nd}$ level category (200) title "Outdoor Living," (202) to one of the $3^{rd}$ level (300) category title, "Furnishing" (302). At any stage during the exploration of category structure and titles, any category at any level can be selected and "clicked" to download the content pages linked to the category title (102, 202, etc). At any stage during the exploration of category structure and titles, rolling the cursor backward causes the higher (latter) level category title lists to disappear from view. Moving the cursor away from the tracking device area (702), all category listing (100, 200, 300, 400) disappear.

The dynamic tracking-string/tracking-device (702) with embedded category browsing/exploration apparatus allows browsers to return to, or forward to any category level (100, 200, 300, 400) to seek a different browsing path from any page, using one single mouse-click and one page download to reach the new destination information of interest.

Figure 8:
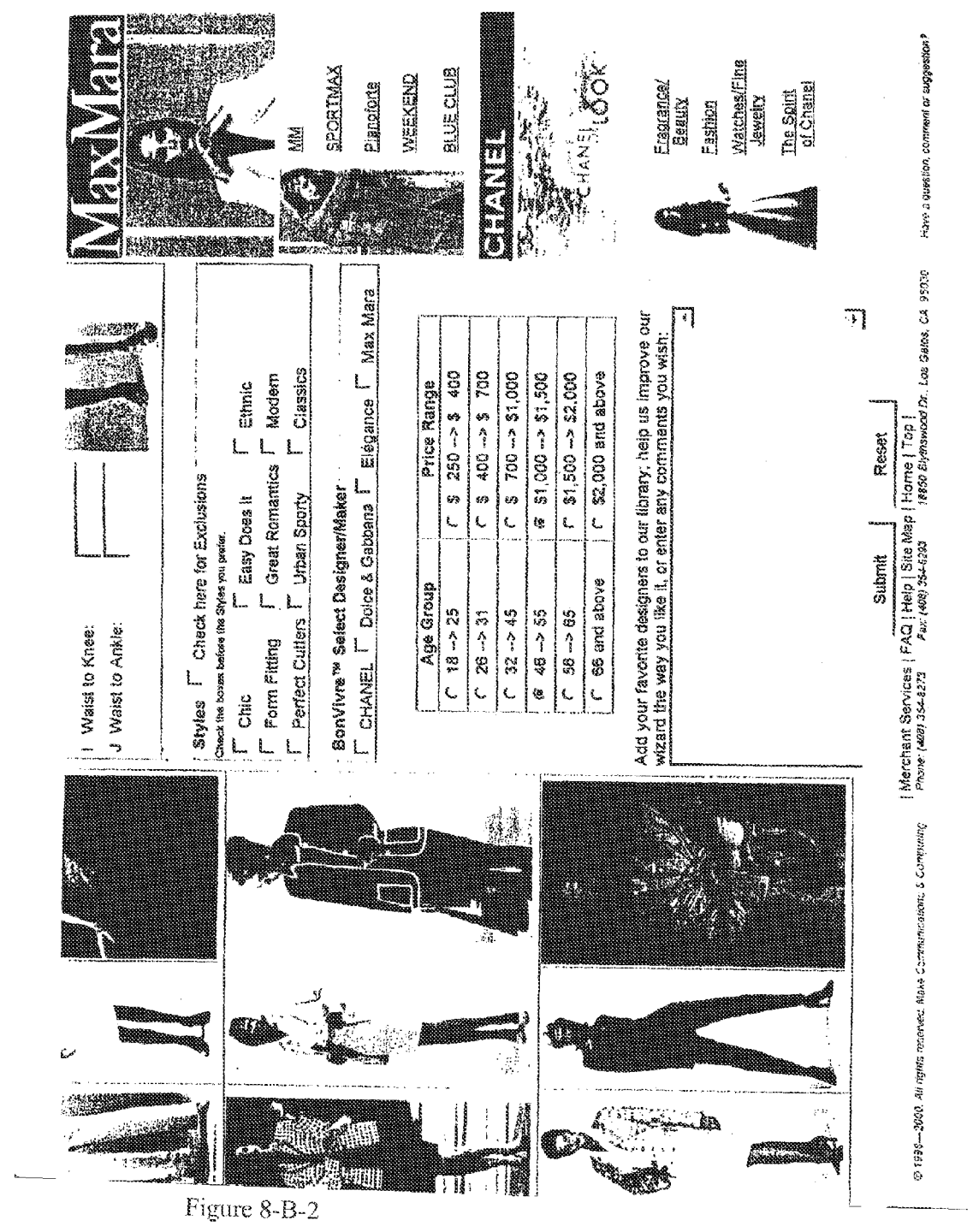

FIG. 8A shows a variation of the embodiment of the "one click" browsing feature of the present invention where the next-level category listing (100, 200, 300, 400) is shown along side the previous level at an even level at the top. The notation for which category's next-level is shown, is indicated in a change of the background color for that category title.

One can also implement that a single click on a category title prompts the display of its next-level category listing. A single click on another category title "turns off" the old list, and prompts the display of the next-level category listing for this newly "clicked" category. In such implementation, a "double-click" is used to call for the downloading of the URL page linked by the particular link-token to the "double-clicked" category title.

FIGS. 8B1 and 8B2 illustrate one embodiment of the tracking device of the present invention. The text-string (the tracking-string) (702) at the top of the page indicates the particular sequence of category browsing path of the current page displayed on the screen. Normally, there is no drop-down menu shown on the screen to interfere with the display of the current page. When the browser brings the cursor to any category title (110, 210, 310, 410, 510, or 610) along the browsing path indicated by the tracking-string (702), a drop-down menu (100, 200, 300, 400, 500, or 600) would appear to show the parallel category titles to that category. It can also be implemented that the drop-down menu (100, 200, 300, 400, 500, or 600) appears only with the prompting of a single click (prompting-click) on that category title (110, 210, 310, 410, 510, or 610) on the tracking string (702), and stays on until after another prompting-click on the same category title (110, 210, 310, 410, 510, or 610) is performed. At which time, the drop-down menu (100, 200, 300, 400, 500, or 600) disappears. Note that the prompting-clicks are only used to turn the drop-down menu (100, 200, 300, 400, 500, or 600) "on" and "off", but not to download anything from the remote storage device. To call for the download of an URL page from within the browsing and tracking device (702) of the present invention in this implementation, a "double-clicking" is used.

When the cursor is moved to any other category title (110, 210, 310, 410, 510, or 610) along the tracking-string (702), in the "no click" implementation, the first drop-down menu (100, 200, 300, 400, 500, or 600) under the category title (110, 210, 310, 410, 510, or 610) where the cursor was placed previously would disappear, and the new drop-down menu (100, 200, 300, 400, 500, or 600) showing parallel category titles to the category (110, 210, 310, 410, 510, or 610) the cursor is presently pointing. When the cursor is rolled down along the drop-down menu (100, 200, 300, 400, 500, or 600) to a different category title (102, 202, etc.), and resting on one particular category title (102, 202, etc.), its next-level category title (200, 300, 400, 500, or 600) listing appears to the left of the particular category title (102, 202, etc.) the cursor is resting to pointing on, as described in "One Click Category Browsing" device in FIG. 8B1.

When the cursor is moved to any other category title (110, 210, 310, 410, 510, or 610) along the tracking-string (702), in the "prompting-click" implementation, the first drop-down menu (100, 200, 300, 400, 500, or 600) under the category title (110, 210, 310, 410, 510, or 610) where the cursor was placed previously would stay on, and the new drop-down menu (100, 200, 300, 400, 500, or 600) showing parallel category titles to the new category (110, 210, 310, 410, 510, or 610) the cursor is presently pointing to would appear if the browser "clicks" on this present category. One can move from one category title (110, 210, 310, 410, 510, or 610) to another along the tracking-string (702), in no particular sequence, to "click" once to see the parallel category titles listed (100, 200, 300, 400, 500, or 600), and another "click" to turn of the list-make it disappear from the screen. When the cursor is rolled down along the drop-down menu (100, 200, 300, 400, 500, or 600) to a different category title (102, 202, etc), and rests on one particular category title (102, 202, etc), its next-level category title list (200, 300, 400, 500, or 600) appears to the left of the particular category title (102, 202, etc) the cursor is presently resting on, as illustrated in "One Click Category Browsing" device in FIG. 8B1. The drop-down menu (200, 300, 400, 500, or 600) for the next-level tracking-string (702) category currently indicated can be programmed to disappear to avoid confusion, or can stay on in the background, if the new "pop-up" menu (200, 300, 400, 500, or 600) for the other now indicated category (102, 202, etc) overlaps a part of the tracking-string drop-down menu (100, 200, 300, 400, 500, or 600). The branching into a different category browsing path from the current page can be indicated with a different background color, if so desired.

The present invention is implemented using software which can be written in many programming languages, or implemented with many web-page generation tools. The present invention can be used on a global or local computer network, on a personal computer, on viewable storage media such as a CD or DVD ROM, on a wireless telephone, on a wireless personal assistant such as a Palm Pilot®, or on any type of wired or wireless device that enables digitally stored information to be viewed. Also, information displayed and viewed using the present invention can be printed, stored to other storage medium, and electronically mailed to third parties.

Numerous modifications to and alternative embodiments of the present invention will be apparent to those skilled to the art in view of the foregoing description. Accordingly, this description is to be construed as illustrative only and is for the purpose of teaching those skilled in the art the best mode of carrying out the invention. Details of the structure may be varied substantially without departing from the spirit of the invention and the exclusive use of all modifications which come within the scope of the appended claims is reserved.

What I claim is:

1. A system for navigating and browsing electronic media, comprising:

a device enabling viewing of digitally stored information, the device being configured to display at least portions of a categorization structure for substantially all of a website having a plurality of nested cascading category levels, each category level of the plurality of nested cascading category levels comprising a plurality of category titles of electronic media content stored on at least one storage device, each category title having a selectable link-token to the stored content for said each category title, said each category title also being coupled to a nested subcategory structure of said each category title, the nested subcategory structure of said each category title comprising link-tokens of category titles wherein said each category title and the category titles in the different plurality of category levels are able to be browsed independently of having to select and retrieve the stored content for any title from the at least one storage device, wherein the categorization structure enables a user viewing content of any category title in the categorization structure to retrieve content of any other category title in the categorization structure using a single retrieval command.

2. The system according to claim 1, wherein link-tokens of one or more category titles in a first category level of the plurality of nested cascading category levels are displayed for viewing on a display device in response to placing a cursor on a starting symbol representing a gateway to viewing the categorization structure displayed on the display device, without clicking.

3. The system according to claim 2, wherein the link-tokens of one or more category titles in the first category level are displayed on the display device underneath the starting symbol representing the gateway to viewing the categorization structure.

4. The system according to claim 2, wherein placing the cursor on one link-token of the link-tokens of the one or more category titles in the first category level causes the title corresponding to the one link-token to be changed in appearance and causes a second category level having a second plurality of titles to be displayed alongside the first category level, the plurality of titles in the second category level being subcategories of the category title changed in appearance in the first category level.

5. The system according to claim 4, wherein the titles in the second category level are displayed in a second listing-area with the titles listed one under the other.

6. The system according to claim 4, wherein placing the cursor on one title of the category titles displayed in the second category level causes said one title of the category titles displayed in the second category level to be changed in appearance and causes a third category level having a third plurality of category titles to be displayed alongside the second category level, the plurality of tides in the third category level being sub-categories of the changed in appearance title displayed in the second category level.

7. The system according to claim 2, wherein the titles in the first category level are displayed in a first listing-area with the titles listed one under the other.

8. The system according to claim 2, wherein the categorization structure resides with the pages of media content but is not displayed on the display device with the media content until a browser places the cursor on the starting symbol.

9. The system according to claim 2, wherein the media content are the pages of a web site.

10. The system according to claim 9, wherein a browser can navigate and browse the different category titles in the different category levels of the categorization structure without having to down load a web page from the storage device and without having to navigate back and forth between different web pages.

11. The system according to claim 9, wherein the categorization structure resides with the web pages but is not displayed on the display device with the web pages until a browser places the cursor on the starting symbol.

12. The system according to claim 1, wherein the system has a selectable number of category levels.

13. The system according to claim 1, wherein the system has a selectable number of category titles in each category level.

14. The system according to claim 1, wherein the system is implemented using software, and wherein the single retrieval command is a single click.

15. The system according to claim 1, wherein when the cursor is moved from a category level having a plurality of category titles which are sub-categories of a title in a higher category level, the category level with the plurality of sub-category titles, and all subsequent category levels cease to be displayed on the display device.

16. The system according to claim 1, wherein when the cursor is moved from a first category title in a first category level to a second category title in the first category level, a first plurality of sub-category titles of the first category title in a second, lower category level ceases to be displayed on the display device, and a second plurality of sub-category titles of the second category title on which the cursor now rests is displayed in a second category level on the display device.

17. The system according to claim 1, wherein a browser can browse the categorization structure independently of any media content displayed on the display device.

18. The system according to claim 1, wherein a browser can navigate and browse the different category titles in the different category levels of the categorization structure without having to select and retrieve a page of media content from the storage device and without having to navigate back and forth between different pages of media content.

19. The system according to claim 1, wherein a browser can navigate back and forth between a category title in a first category level and a category title in a second category level of the categorization structure.

20. The system according to claim 1, wherein a browser can move from a first or any category title in a particular level to any other title in the same level of the categorization structure.

21. A system of claim 1, wherein the interlinked content structure is hidden from view and a subcategory structure is not displayed until a cursor rolls over a respective category title.

22. A system for tracking the navigation and browsing of electronic media, and facilitating the changing of navigation and browsing path, the system comprising a computer configured to display to a user pages of content within an inter-linked content structure having a textual table format comprising at least three category levels, and to enable the user to retrieve with one single retrieval command any desired content page within the inter-linked content structure from a display of every other content page of the inter-linked content structure.

23. A system for navigating and browsing electronic media, comprising:
  a device for viewing of digitally stored information, the device being configured to display at least portions of a categorization tree structure having a plurality of cascading category lists, each list of the plurality of cascading category lists comprising a plurality of category titles to electronic media content stored on at least one storage device, each category title having a selectable link-token to the stored content file for said each category title, wherein the device is configured to display one or more link-tokens in the stored content file for said each category title in response to placement of a cursor on the selectable link-token of said category title without clicking on or invocation of the selectable link-token of said category title, whereby the system enables the category titles in the different plurality of category lists to be browsed independently of selecting and retrieving stored content files for any title from the at least one storage device, wherein the categorization tree structure enables a user viewing content of any category title in the categorization structure to retrieve content of any other category title in the categorization structure using a single retrieval command.

24. A system with one or more processors and memory that enables digitally stored information to be viewed on a display device, comprising:
  a website comprising a plurality of web pages;
  a hierarchical categorization structure including a plurality of levels of nested references for substantially all of the web pages in the website,
  a displayed categorization structure that is viewable in conjunction with the content of any web page in the categorization structure and that includes at least a subset of the categorization structure references, such that a user is able to retrieve content of any other web page in the categorization structure by selecting using a single selection gesture a respective reference in the displayed categorization structure; and
  a gateway symbol displayed on at least some of the plurality of web pages for accessing the displayed categorization structure.

25. The system of claim 24, wherein the categorization structure is embedded in substantially all of the web pages in the website.

26. The system of claim 24, wherein the categorization structure is linked to substantially all of the web pages in the website.

* * * * *